(12) United States Patent
Bushnell et al.

(10) Patent No.: US 9,600,801 B2
(45) Date of Patent: Mar. 21, 2017

(54) SYSTEMS AND METHODS FOR INTEGRATING RESEARCH AND INCORPORATION OF INFORMATION INTO DOCUMENTS

(75) Inventors: Christopher G. Bushnell, Salt Lake City, UT (US); Matthew D. Johnson, South Jordan, UT (US)

(73) Assignee: Architectural Computer Services, Inc., Salt Lake City, UT (US)

( * ) Notice: Subject to any disclaimer, the term of this patent is extended or adjusted under 35 U.S.C. 154(b) by 0 days.

(21) Appl. No.: 13/100,116

(22) Filed: May 3, 2011

(65) Prior Publication Data

US 2012/0284596 A1 Nov. 8, 2012

(51) Int. Cl.
*G06F 17/24* (2006.01)
*G06Q 10/10* (2012.01)
*G06Q 10/06* (2012.01)

(52) U.S. Cl.
CPC ........... *G06Q 10/10* (2013.01); *G06F 17/243* (2013.01); *G06Q 10/06* (2013.01)

(58) Field of Classification Search
CPC ............. G06F 17/243; G06F 17/30011; G06F 17/211; G06F 17/2229; G06F 9/5038
(Continued)

(56) References Cited

U.S. PATENT DOCUMENTS 5,341,469 A 8/1994 Rossberg et al.
5,754,737 A 5/1998 Gipson
(Continued)

FOREIGN PATENT DOCUMENTS

CN 101027637 A 8/2007
JP 6103264 A 4/1994
(Continued)

OTHER PUBLICATIONS

Hagedorn et al, "High-Level Web Service for 3D Building Information Visualization and Analysis", publisher: ACM, Date: Nov. 2007, pp. 1-8.*
(Continued)

*Primary Examiner* — Wilson Tsui
(74) *Attorney, Agent, or Firm* — LeClairRyan, a Professional Corporation

(57) ABSTRACT

Systems and methods for integrating research and incorporation of information into a construction specification involve providing information for potential inclusion in a specification to a user as part of the specification editing process so as to reduce the time spent in finding and researching information and including the information in the specification. A template specification with sections is provided, each section having one or more computer links corresponding to potential customization of the section with customized information. In response to selection of the link, construction information for potential inclusion in the template specification as a customization thereof corresponding to the selected computer link is retrieved from a database of construction information and is displayed adjacent the template specification. A selection of a portion of the construction information for inclusion in the specification is received, and an appropriate portion of the construction information is automatically incorporated into the specification.

18 Claims, 14 Drawing Sheets

(58) Field of Classification Search
USPC ....... 715/221, 224, 226, 243, 248, 253, 255, 715/271
See application file for complete search history.

(56) References Cited

U.S. PATENT DOCUMENTS

| | | | |
|---|---|---|---|
| 5,900,004 A | 5/1999 | Gipson | |
| 5,924,109 A * | 7/1999 | Ackerman | G06Q 10/10 707/999.01 |
| 6,006,242 A | 12/1999 | Poole et al. | |
| 6,223,343 B1 | 4/2001 | Hopwood et al. | |
| 6,236,409 B1 | 5/2001 | Hartman | |
| 6,581,040 B1 | 6/2003 | Wright et al. | |
| 6,625,619 B1 | 9/2003 | McClendon et al. | |
| 6,810,401 B1 | 10/2004 | Thompson et al. | |
| 6,859,768 B1 | 2/2005 | Wakelam et al. | |
| 6,976,213 B1 | 12/2005 | Letourneau et al. | |
| 7,031,930 B2 * | 4/2006 | Freeman et al. | 705/7.13 |
| 7,162,688 B1 | 1/2007 | Gillig | |
| 7,337,151 B2 | 2/2008 | Lopez et al. | |
| 7,716,639 B2 * | 5/2010 | Dahlin et al. | 717/121 |
| 7,720,814 B2 * | 5/2010 | Jones et al. | 707/640 |
| 7,818,678 B2 * | 10/2010 | Massand | 715/751 |
| 7,937,663 B2 * | 5/2011 | Parker et al. | 715/751 |
| 8,185,819 B2 * | 5/2012 | Sah et al. | 715/243 |
| 2002/0077939 A1 * | 6/2002 | Nicastro et al. | 705/29 |
| 2003/0135429 A1 | 7/2003 | Pous et al. | |
| 2003/0177070 A1 * | 9/2003 | Viswanath et al. | 705/26 |
| 2003/0196176 A1 | 10/2003 | Abu-Ghazalah | |
| 2005/0005239 A1 | 1/2005 | Richard | |
| 2005/0044010 A1 * | 2/2005 | Jannott et al. | 705/26 |
| 2005/0044476 A1 * | 2/2005 | Bursten | 715/500 |
| 2006/0185275 A1 | 8/2006 | Yatt | |
| 2006/0245307 A1 * | 11/2006 | So et al. | 369/1 |
| 2008/0195405 A1 | 8/2008 | Lopez et al. | |
| 2009/0259953 A1 | 10/2009 | Jannott et al. | |

FOREIGN PATENT DOCUMENTS

| | | |
|---|---|---|
| JP | 2000155781 A | 6/2000 |
| KR | 20010092638 A | 10/2001 |
| WO | 2010000017 A1 | 1/2010 |
| WO | 2010020087 A1 | 2/2010 |

OTHER PUBLICATIONS http://www.spectext.com; website active Sep. 13, 2011.
http://www.raic.org/practice/specifications/nms_e.htm; website active Sep. 13, 2011.
http://www.1stpricing.com/designer.htm; website active Sep. 13, 2011.
http://www.bsdsoftlink.com/speclink/speclink.htm; website active Sep. 13, 2011.
http://www.e-specs.com; website active Sep. 13, 2011.
http://e-specs.com/news-release060111.html; website active Sep. 13, 2011.
http://www.arcomnet.com/masterspec/specware.php; website active Sep. 13, 2011.
http://specsintact.ksc.nasa.gov/software/SI32/AboutSpecsIntact.htm; website active Sep. 13, 2011.

* cited by examiner

SYSTEMS AND METHODS FOR INTEGRATING RESEARCH AND INCORPORATION OF INFORMATION INTO DOCUMENTS

BACKGROUND OF THE INVENTION

1. Field of the Invention

The present invention relates to construction specifications and other documents, and more particularly to systems and methods that facilitate and integrate research of information for inclusion in such documents with inclusion of the researched information into the documents.

2. Background and Related Art

Construction specifications, along with drawings, are prepared as part of the contract documents for constructing a facility and are typically assembled into a Project Manual along with the bidding documents. Part of the process of preparing specifications includes researching construction products, materials, systems, and assemblies for inclusion of relevant information into the specifications.

The current state of the art for researching products is for design professionals to review hardcopy binders of manufacturer's products, view manufacturer's web sites, or view online product directories. This can be a tedious and time-consuming process for design professionals. After construction products are selected, design professionals determine the features, capabilities, and attributes of the products that are appropriate for the project. Once that has been done, design professionals must generate and include the appropriate language in the specification. This process includes indicating the manufacturer's name and the product name. This specifying process is currently disconnected from the researching process. Similar problems may be encountered in industries other than the construction specification industry.

BRIEF SUMMARY OF THE INVENTION

Implementation of the invention provides systems, methods, and non-transitory computer-readable media storing computer instructions for implementing methods for integrating research and incorporation of information into a construction specification. A computer-aided method for integrating research and incorporation of information into a construction specification includes providing a template specification having a plurality of sections, each section having one or more computer links corresponding to potential customization of the section with customized information and receiving a selection of one of the computer links. In response to selection of the link, construction information for potential inclusion in the template specification as a customization thereof corresponding to the selected computer link is retrieved from a database of up-to-date construction information and is displayed adjacent to the template specification. A selection of a portion of the construction information for inclusion in the template specification is received, and appropriate construction information is automatically incorporated into the template specification based on the selection of the portion of the construction information for inclusion, as determined by the system.

The construction information may include construction product and material information, sustainability information for construction products and materials, construction standards information, cost information for construction products and materials, manufacturer information for construction products and materials, and properties of construction products and materials including attributes, values, units of measure, and test methods. When the construction information is initially displayed, it may be displayed with an initial designation indicating that the information is under evaluation for inclusion in the template specification, receipt of a new designation indicates whether the information is accepted or rejected for inclusion in the template specification, and the portion of the information designated as accepted is included in the template specification. When updates to the database of information of additional construction information are received, the additional construction information is displayed as being under evaluation upon any later selection of the corresponding computer link.

The database may be updated to include additional construction information in various ways. In one form of update, an upload of the additional construction information is received from a representative of an entity providing information for inclusion in the template specification, such as a product manufacturer, construction standards generating entity, or the like. In another form of update, a comment regarding accuracy of information already on the database is received from a user customizing the template specification and aware of updated information. An entity maintaining the database could also generate an update based on discovered updated information. An update could also occur or be initiated through monitoring electronically-accessible content such as a manufacturer website.

The displayed construction information may incorporate research links wherein receipt of a selection of one of the research links causes a display of additional details associated with the construction information, the additional details providing information to assist in evaluating whether to include the construction information in the template specification. Additionally, the construction information displayed adjacent the template specification may change with a change in a selection of the section of the template specification. Further interaction with the construction information may occur whereby reasons for inclusion of the construction information in the template specification are received and stored as the construction information selected for inclusion is incorporated into the template specification.

In further implementation of some embodiments of the invention, a computer-aided method for integrating research and incorporation of information into an information-rich document includes providing a template document having a plurality of computer links corresponding to locations of potential customization of the template document with customized information and receiving at a computer system a selection of one of the computer links. In response, a plurality of potential items of information are retrieved for possible inclusion in the template document as a customization thereof corresponding to the selected computer link from a database of up-to-date information items and are provided as a listing of the potential items of information for inclusion in the template document. The computer system receives a selection of one or more of the potential items of information for inclusion in the template document, and appropriate items of information are automatically incorporated into the template document based on the selection of one or more of the potential items of information for inclusion.

In at least some implementations, the listing of potential items of information is initially provided as a listing of items under consideration. When a designation as to whether the item is rejected or accepted for inclusion in the template document is received and stored, and an instruction to update the template document is received, those items of information that were designated as accepted for inclusion into the template document are incorporated into the template document and metadata about the choice is stored. Any later selection of the computer link will re-display items lacking a designation as to whether the item is rejected or accepted for inclusion in the template document as being under consideration, any rejected items as being rejected, and any items selected for incorporation as being designated for inclusion in the template document. Upon receipt of a later selection of the computer link, any updated or additional information item may also be displayed as being under consideration.

In some implementations, the template document initially contains a section of information related to the selected computer link, and the section of information related to the selected computer link is replaced with appropriate items of information automatically incorporated into the template document based on the selection of one or more of the potential items of information for inclusion. The information-rich document may be a construction specification such as a project life cycle description, a preliminary project description, an outline specification, a short form specification, a long form specification, a record specification, an operation and maintenance specification, or a customized office master of any of these.

In additional implementations, systems, methods, and non-transitory computer-readable media storing computer instructions for implementing methods for integrating research and incorporation of information into a computer-aided design (CAD) drawing, an electronic building information model (BIM), and/or an electronic geographical information system (GIS) are provided. A computer-implemented method for integrating research and incorporation of information into a CAD drawing, electronic BIM, and/or electronic GIS may include displaying a CAD drawing, electronic BIM, and/or electronic GIS having a plurality of selectable elements corresponding to locations of potential customization of the CAD drawing, electronic BIM, and/or electronic GIS with customized information. In response to a selection of one of the selectable elements, a plurality of potential items of information for possible inclusion in the CAD drawing, electronic BIM, and/or electronic GIS as a customization thereof corresponding to the selected selectable element are retrieved from a database of up-to-date information items. A listing of the potential items of information for inclusion in the CAD drawing, electronic BIM, and/or electronic GIS is provided and a selection of one or more of the potential items of information for inclusion in the CAD drawing and electronic BIM is received. Appropriate items of information are automatically incorporated into the CAD drawing, electronic BIM, and/or electronic GIS based on the selection of one or more of the potential items of information.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
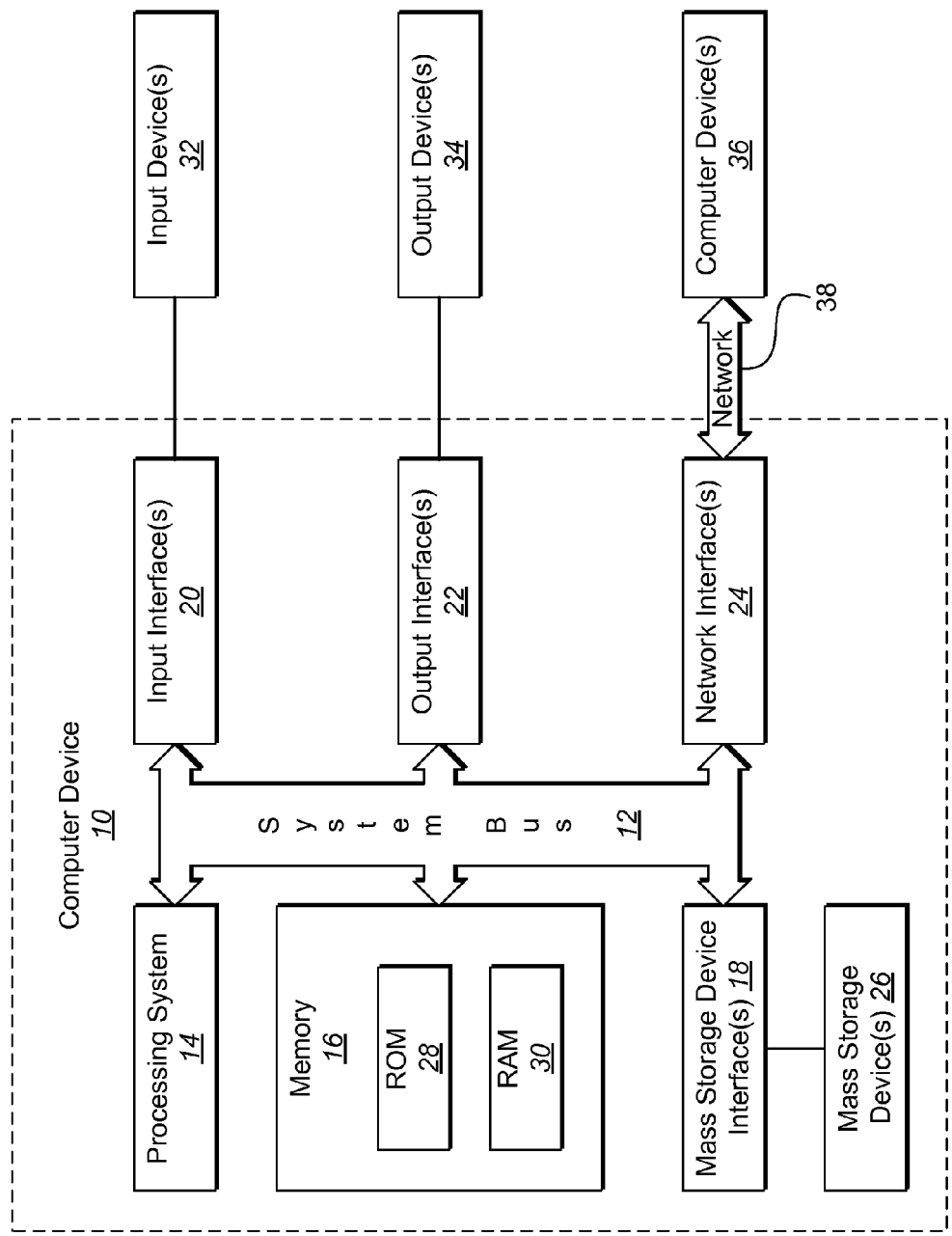
FIG. 1 shows a representative computer system that may be used with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems, methods, and non-transitory computer-readable media storing computer instructions for implementing methods for integrating research and incorporation of information into a construction specification. A computer-aided method for integrating research and incorporation of information into a construction specification includes providing a template specification having a plurality of sections, each section having one or more computer links corresponding to potential customization of the section with customized information and receiving a selection of one of the computer links. In response to selection of the link, construction information for potential inclusion in the template specification as a customization thereof corresponding to the selected computer link is retrieved from a database of up-to-date construction information and is displayed adjacent to the template specification. A selection of a portion of the construction information for inclusion in the template specification is received, and the appropriate construction information is automatically incorporated into the template specification based on the selection of a portion of the construction information for inclusion, as determined by the system.

The construction information may include construction product and material information, sustainability information for construction products and materials, construction standards information, cost information for construction products and materials, manufacturer information for construction products and materials, and properties of construction products and materials including attributes, values, units of measure, and test methods. When the construction information is initially displayed, it may be displayed with an initial designation indicating that the information is under evaluation for inclusion in the template specification, receipt of a new designation indicates whether the information is accepted or rejected for inclusion in the template specification, and the portion of the information designated as accepted is included in the template specification. When updates to the database of information of additional construction information are received, the additional construction information is displayed as being under evaluation upon any later selection of the corresponding computer link.

The database may be updated to include additional construction information in various ways. In one form of update, an upload of the additional construction information is received from a representative of an entity providing information for inclusion in the template specification, such as a product manufacturer, construction standards generating entity, or the like. In another form of update, a comment regarding accuracy of information already on the database is received from a user customizing the template specification and aware of updated information. An entity maintaining the database could also generate an update based on discovered updated information. An update could also occur or be initiated through monitoring electronically-accessible content such as a manufacturer website.

The displayed construction information may incorporate research links wherein receipt of a selection of one of the research links causes a display of additional details associated with the construction information, the additional details providing information to assist in evaluating whether to include the construction information in the template specification. Additionally, the construction information displayed adjacent the template specification may change with a change in a selection of the section of the template specification. Further interaction with the construction information may occur whereby reasons for inclusion of the construction information in the template specification are received and stored as user-specific metadata as the construction information selected for inclusion is incorporated into the template specification.

In some embodiments of the invention, a computer-aided method for integrating research and incorporation of information into an information-rich document includes providing a template document having a plurality of computer links corresponding to locations of potential customization of the template document with customized information and receiving at a computer system a selection of one of the computer links. In response, a plurality of potential items of information are retrieved for possible inclusion in the template document as a customization thereof corresponding to the selected computer link from a database of up-to-date information items and are provided as a listing of the potential items of information for inclusion in the template document. The computer system receives a selection of one or more of the potential items of information for inclusion in the template document, and appropriate items of information are automatically incorporated into the template document based on the selection of one or more of the potential items of information for inclusion.

In at least some embodiments, the listing of potential items of information is initially provided as a listing of items under consideration. When a designation as to whether the item is rejected or accepted for inclusion in the template document is received and stored, and an instruction to update the template document is received, those items of information that were designated as accepted for inclusion into the template document are incorporated into the template document and metadata about the choice is stored. Any later selection of the computer link will re-display items lacking a designation as to whether the item is rejected or accepted for inclusion in the template document as being under consideration, any rejected items as being rejected, and any items selected for incorporation as being designated for inclusion in the template document. Upon receipt of a later selection of the computer link, any updated or additional information item may also be displayed as being under consideration.

In some embodiments, the template document initially contains a section of information related to the selected computer link, and the section of information related to the selected computer link is replaced with items of information automatically incorporated into the template document based on the selection of one or more of the potential items of information for inclusion. The information-rich document may be a construction specification such as a project life cycle description, a preliminary project description, an outline specification, a short form specification, a long form specification, a record specification, an operation and maintenance specification, or a customized office master of any of these.

In additional embodiments of the invention, systems, methods, and non-transitory computer-readable media storing computer instructions for implementing methods for integrating research and incorporation of information into a computer-aided design (CAD) drawing, an electronic building information model (BIM), and an electronic geographical information system (GIS) are provided. A computer-implemented method for integrating research and incorporation of information into a CAD drawing, electronic BIM, and/or electronic GIS may include displaying a CAD drawing, electronic BIM, and/or electronic GIS having a plurality of selectable elements corresponding to locations of potential customization of the CAD drawing, electronic BIM, and/or electronic GIS with customized information. In response to a selection of one of the selectable elements, a plurality of potential items of information for possible inclusion in the CAD drawing, electronic BIM, and/or electronic GIS as a customization thereof corresponding to the selected selectable element are retrieved from a database of up-to-date information items. A listing of the potential items of information for inclusion in the CAD drawing, electronic BIM, and/or electronic GIS is provided and a selection of one or more of the potential items of information for inclusion in the CAD drawing, electronic BIM, and/or electronic GIS is received. Appropriate items of information are automatically incorporated into the CAD drawing, electronic BIM, and/or electronic GIS based on the selection of one or more of the potential items of information.

Some embodiments of the invention eliminate many of the problems with the current process of finding, researching, and integrating information into specifications (in the construction industry) and other documents (in any industry). Embodiments of the invention facilitate, for example, finding catalog information about construction products, finding sustainability information about construction products, finding construction standards, and finding cost information about construction products. Embodiments of the invention further facilitate subsequently incorporating this information into the construction specifications.

Thus, the user may be provided a method to find information about construction products that are or could be listed in the specifications including product manufacturers, catalogs, photos, and videos. The user may be provided a method to find sustainability information about construction products that are or could be listed in the specifications. The user may also be provided a method to find construction standards that relate to or could relate to the specifications including those published by standards setting organizations. The user may further be provided a method to find cost information about construction products that are or could be listed in the specifications including general cost per square foot and detailed costs. All this information can be incorporated into the specifications in an automated way through software.

In some embodiments of the invention, the user is provided methods to evaluate construction products and is provided with one or more methods for sorting them relative to inclusion in the specifications. The user may be provided methods to document reasons for selecting and incorporating construction products. The user may further be provided a method to share construction product selections and reasons for selection with other members of a project team. This allows the team to communicate more effectively and to track the progress of decisions about the project.

In some embodiments of the invention, the user selects construction products, materials, systems, and/or assemblies from a dynamically generated master list of manufacturers and their products, rather than being limited to a static list provided in a master specification. According to embodiments of the invention, the appropriate list of manufacturers is dynamically assembled from a database, and the resulting list is automatically displayed in a web browser window or the like. As the resulting list may be assembled at the time of generating the specification document, it may include product and manufacturer information that is up-to-date as of the time of assembly of the resulting list. This eliminates the need for the design professional to do additional research for more manufacturers.

In some embodiments of the invention, the user selects construction standards from a dynamically generated master list of standards, rather than being limited to a static standard listing provided in a master specification. According to embodiments of the invention, the appropriate list of standards is assembled from a database, and the resulting list is automatically displayed in a web browser window or the like. As the resulting list may be assembled at the time of generating the specification document, it may include construction standards information that is up-to-date as of the time of assembly of the resulting list. This eliminates the need for the design professional to verify whether the standard is the latest available.

In some embodiments of the invention, the user selects the cost of construction products from a dynamically generated master list of costs. According to embodiments of the invention, the appropriate list of costs is assembled from a database, and the resulting list is automatically displayed in a web browser window or the like. As the resulting list may be assembled at the time of generating the specification document, it may include cost information that is up-to-date as of the time of assembly of the resulting list. This eliminates the need for the design professional to verify the costs from a separate cost source. Additional classes of information relevant to construction, such as project management information, sustainability information, related building information model (BIM) and geographical information system (GIS) objects, certifications, and code requirements, may also be displayed.

While the discussion herein describes assembling information as well as lists of information, it should be understood that the amount of information and number of items of information assembled in each list of information can vary in size from a large number of items to a small number of items. Indeed, a list of information items may include a single information item. In the event that no information items satisfy the scope of information to be assembled into a particular list, the list could be empty. Updates to information stored on the database can cause the sizes of various lists to vary over time.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, touchscreen, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
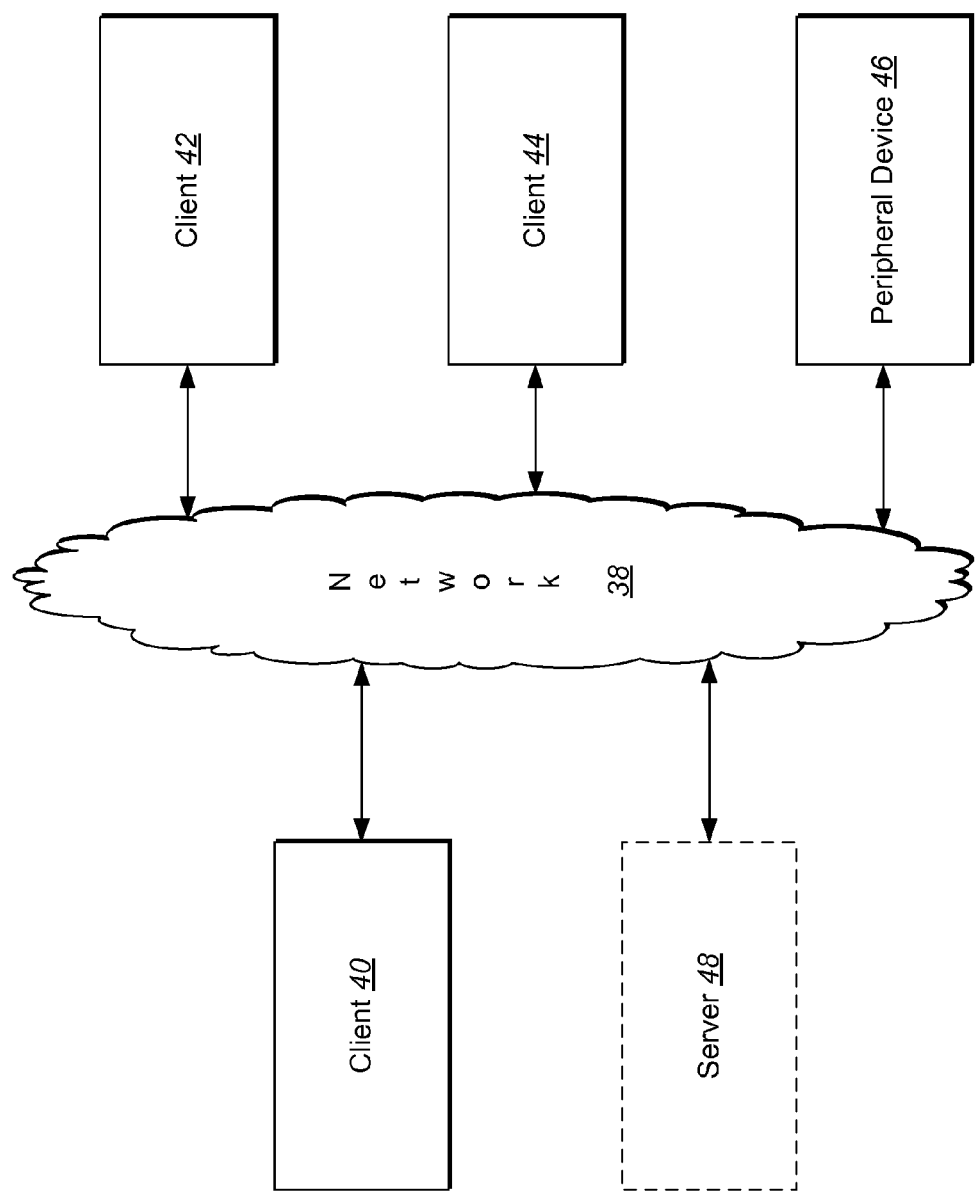
FIG. 2 shows a representative networked computer system that may be used with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Embodiments of the invention eliminate many of the problems with the current process of finding information for inclusion into a document such as a construction specification and incorporating located information into the construction specification or other document. In embodiments of the invention utilized for finding, researching, and incorporating information into a construction specification, the embodiments may be utilized with any type of construction specification document, including a master specification, a sub-master specification such as an office master specification, a life cycle description, a preliminary project description, an outline specification, a short form specification, a long form specification, a record specification, an operation and maintenance specification, or a customized office master specification of any of the preceding group, for example. While it will be appreciated that embodiments of the invention may be advantageously used in multiple fields, it is anticipated that embodiments of the invention will be best understood through the use of examples discussed with respect to the construction specification industry; therefore, such embodiments of the invention are discussed with respect to the accompanying Figures.

Figure 3:
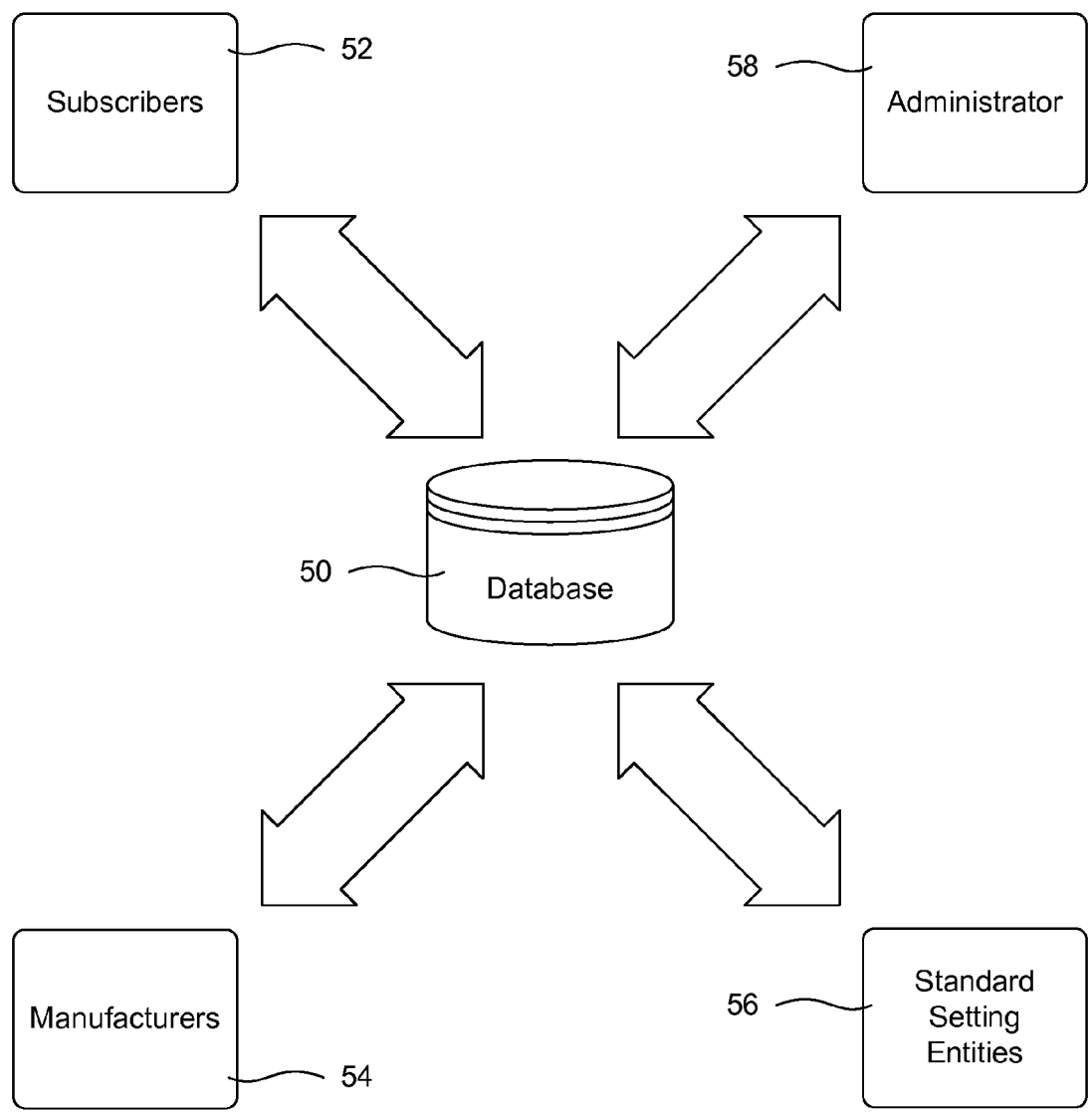
FIG. 3 illustrates a relationship between various entities and a database of information.

To facilitate the finding of information, research of information, and incorporation of information into a document, an entity providing up-to-date information to subscribers of the information maintains a database 50 of the up-to-date information, such that the database 50 can be accessed by the subscribers or other users. As is illustrated in FIG. 3, the database 50 may be accessed by a variety of users, such as subscribers 52, manufacturers 54, standard setting entities 56, and administrators 58. The illustrated users should be considered illustrative only, other users not specifically illustrated could access the database 50, and not all users illustrated in FIG. 3 need necessarily have access to the database 50 in all embodiments. Access to the database 50 can occur over any networked computer system, including over the Internet, and the different users may use different methods and interfaces to access the database 50. For example, the interface provided to a subscriber 52 may differ from the interface provided to a manufacturer 54 or an administrator 58. Similarly, differing interfaces may be provided between individual subscribers 52 or individual manufacturers 54, such as based on differing levels of services paid for.

In certain embodiments, the database 50 includes information and/or links relating to construction specifications, including information about construction products such as product catalogs, product photos, and product videos, sustainability information about construction products, construction standards, such as standards set by standard setting entities 56 and organizations, cost information about construction products such as from cost estimating databases, and the like. The information and/or links contained in the database 50 are routinely updated such that the information in the database is kept up-to-date such that the database 50 can be depended on to include most to all information that might be needed for incorporation into a given specification. The information contained in the database 50 may be updated from a variety of sources via a variety of mechanisms, including by way of automatic and manual updates.

For example, systems may be in place to provide automatic updates to the database 50 by way of monitoring one or more information sources, such as websites, for changes. While automatic updates of the database 50 may be helpful in some instances, it is common for automatic update systems to fail to locate some information or to fail to characterize located information properly. Therefore, while certain embodiments may optionally utilize automatic update systems, other embodiments do not use such systems. Regardless, the database 50 may be updated by any of the entities or users depicted in FIG. 3. For example, a manufacturer 54 is generally most likely to be best aware of its available products, the characteristics of those products, where information about those products can be located, and the like. Additionally, the manufacturer 54 is likely to be motivated to ensure that subscribers 52 have access to that information so the subscribers can incorporate that information in their construction specifications, resulting in increased use of the manufacturer's products in construction projects. Therefore, the manufacturers 54 can be a reliable source of updates to the database 50.

Similarly, standard setting entities 56 or organizations, including any governmental bodies, are likely to be one of the best sources of information regarding applicable construction standards, and to the extent reliable information can be obtained from these entities, that information can be included in the database 50. In some instances, such as when a manufacturer 54 has not kept the database 50 fully up-to-date, individual subscribers 52 may become aware of outdated information contained in the database 50 and may request or suggest updates to that outdated information. The administrator 58 or administrators 58 can review updated information from any source, whether depicted in FIG. 3 or not, and incorporate updates as necessary. Thus, there are multiple potential sources of updates, all of which can function together to ensure that the database 50 is as up-to-date as possible. As additional manufacturers 54 or other entities become available, their information can also be readily added to the database 50.

Thus, when a subscriber 52 wishes to incorporate information into a construction specification, the subscriber 52 is not limited to utilizing static lists contained in a pre-published master specification commonly provided by a commercial entity. Instead, the subscriber 52 is provided with dynamically-generated lists of up-to-date information, reducing or eliminating the need to do additional research to ensure that information from all sources has been considered and facilitating the automated incorporation of information from a variety of sources into the subscriber's specification documents, as will be discussed in more detail below.

The database 50 may incorporate one or more data structures and formats to facilitate finding data in the database 50, and may further incorporate data structures and formats to facilitate automated incorporation of information into the desired construction specifications. For example, specification documents may contain or be assembled from a collection of master text clauses. The master text clauses may include master classification systems for establishing the order of the specification sections (e.g. CSI/Construction Specifications Canada (CSC) OmniClass, CSI/CSC MasterFormat, CSI Uniformat, ASTM Uniformat, or a proprietary format) and master ordering systems for establishing the order of the master text clauses (e.g. CSI/CSC SectionFormat, or a proprietary format). The master text clauses may be stored electronically, such as in word processing documents, including template documents, in a proprietary database format, or in extensible markup language (xml) or Industry Foundation Classes xml (ifcxml) format.

The master text clauses may include a collection of clauses defining a collection of master manufacturer products, materials, systems, or assemblies, and specific information about the items in the collection. The information contained in the master text clauses may be selected and incorporated into specification documents by way of master checklists of construction products, materials, systems, or assemblies, whereby processing the checklists ensures that all needed information is included in the construction specifications. The master checklists may be linked to the master text clauses in any of a variety of manners, including by way of hyperlinks, xml, or ifcxml.

The database 50 may include many different types of information and/or hyperlinks to external sources of information. For example, the database 50 may include master lists of manufacturers and products, including information describing how to contact the manufacturers of construction products, such as contact information, website information, social media and networking information, and the like. The database 50 may include information describing features, capabilities, and functional and performance characteristics about products. The database 50 may also include photos, videos, product catalogs, product and manufacturer reviews, sustainability information, cost information, and essentially any other electronic data relating to aesthetic, physical, functional, and performance characteristics of the construction products. The database 50 may also include classification systems for assembling the construction information, such as into the construction specifications.

All the information contained on the database 50 may be accessed in a variety of ways. In some embodiments, the database 50 is accessed by a client computer program over a local network. In another embodiment, the database 50 is accessed by software on a client computer over the Internet or another wide-area network. The information can then be displayed visually, such as on a computer monitor or even as printed hardcopy, and is readily available for automated incorporation into construction specification documents.

Any of a variety of user interfaces, including graphical user interfaces (GUIs) may be used to display the information and facilitate its selective incorporation into specification documents.

FIGS. 4-12 show representative depictions of one embodiment of a user interface that may be used with embodiments of the invention. It should be understood that the depictions of FIGS. 4-12 are provided solely for the intent of illustrating features of embodiments of the invention, and are not intended to identically depict any particular user interface. It should also be understood that the depictions of FIGS. 4-12 are limited in what can be displayed in accordance with the requirements of static depiction within this application, and necessarily some information may therefore be truncated or otherwise depicted in a representative fashion in the Figures that might differ from how it might be depicted using a particular user interface.

Figure 4:
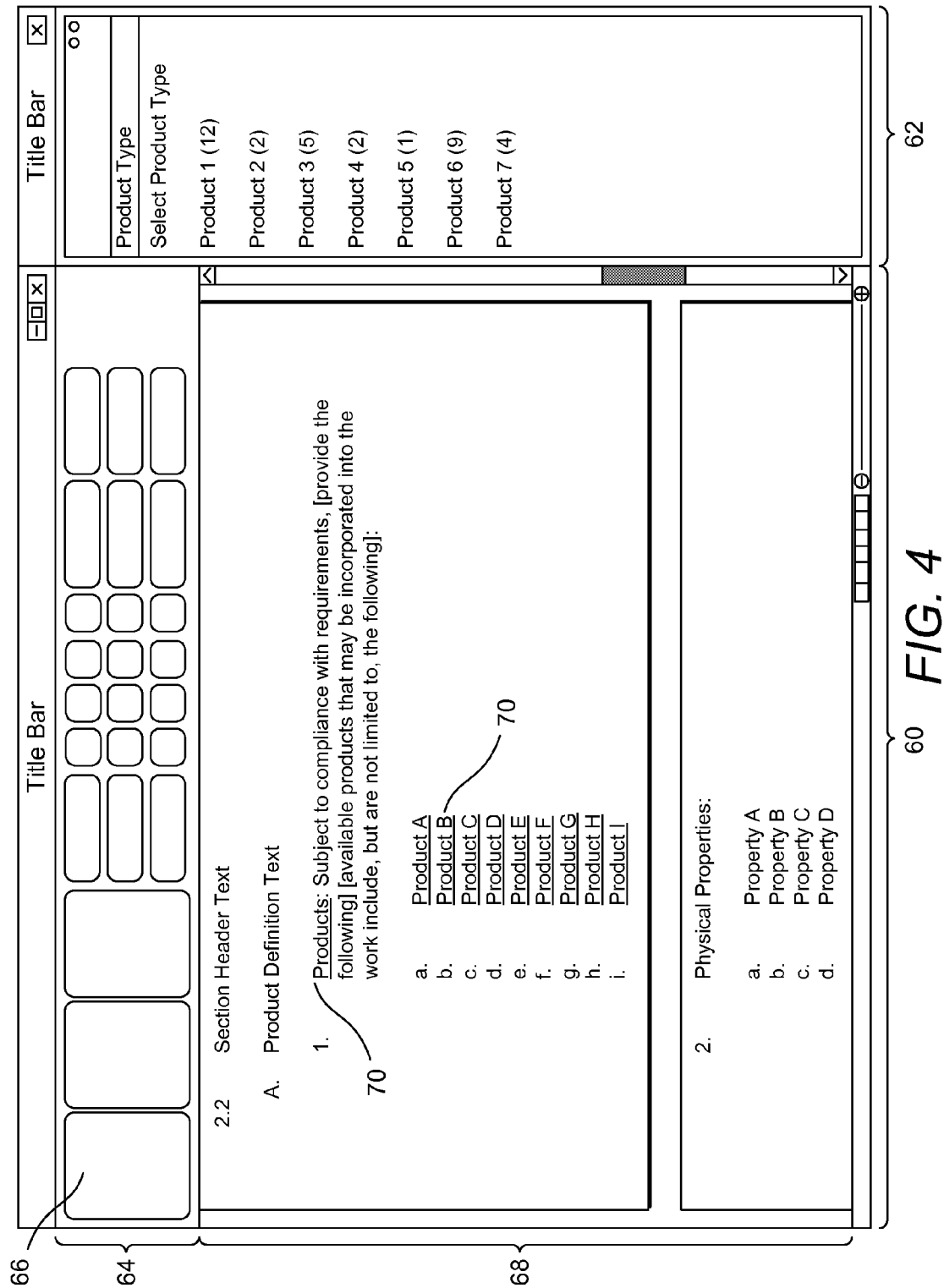
FIGS. 4-12 show screen shots of a representative user interface for use with embodiments of the invention.

FIG. 4 shows a first depiction or screen shot of a user interface. The screen shot of FIG. 4 shows that the screen or window from which the screen shot is taken may be divided into two sections. The left and larger section 60 is a specification editor program, while the right and smaller section 62 is a sidebar. The purpose of the sidebar is to facilitate finding and researching information for potential inclusion in a construction specification, and to facilitate automated incorporation of information into the specification document being edited in the specification editor program.

The specification editor program itself may include features common to such programs, as illustrated in FIG. 4. For example, the editor program may include a menu bar 64 including any of a large variety of function buttons 66 providing rapid access to functions designed to facilitate editing of a construction specification, a portion of which construction specification may be displayed in a display area 68 of the specification editor program. The construction specification as displayed in the display area 68 for editing may be paginated (as shown in FIG. 4) or not, according to the user's desires. While the screen shot of FIG. 4 shows a single set of buttons 66 shown in the menu bar 64, it will be appreciated that more or fewer buttons 66 may be provided, and that the buttons 66 or other function-providing elements may be distributed across a tabbed menu bar 64, as is generally known in the art. The display of the specification editor program (as well as the display of the sidebar) also includes or optionally includes various information bars and window or view controls, such as zoom controls, pagination controls, maximizing, minimizing, and closing controls, and the like, as are commonly known in the programming and user interface art, and further discussion of such elements is therefore omitted.

Turning to the specification document shown in the display area 68, it may be seen that various portions of the document displayed in FIG. 4 are underlined or otherwise given special notation. This represents that these elements are hyperlinks 70 or other functional links providing functionality similar to hyperlinks. In this case, the hyperlinks 70 displayed in the display area 68 serve to control the display of information in the sidebar. As such, upon selection of one of the hyperlinks 70, the program (whether the specification editor program itself or a separate program providing the functionality discussed herein) requests information from the database 50, and the display of the sidebar is altered as appropriate to display information retrieved from the database 50.

Displaying information in the sidebar upon selection of one of the hyperlinks 70 is only one example of a variety of possible interactions that may be provided between the displays of the sidebar and the left section 62. Many possible interactions are discussed in further detail herein. As one possible example, a listener program may be monitoring a specification editing program displayed in the left section 62. Upon a user's opening of a document in the specification editing program, the listener program automatically recognizes the type of document that is opened (such as by a document file extension, characteristics of the document, metadata included in the document, and the like). Then, without the user having selected one of the hyperlinks 70 or other functional links in the document, the listener program automatically displays appropriate content in the sidebar, such as product types or other information relative to the opened document. This may facilitate or hasten research of information related to the opened document and/or may facilitate incorporation of information into the document such as in ways discussed in more detail later.

Another example of a potential interaction provided between the display of the sidebar and the left section 62 is the modification of which portion of a document being edited is displayed in the left section 62 based on selections made in the sidebar. Continuing, for example, with the example of the listener program, after a document is opened by the specification editing program and product types are displayed in the sidebar, the user might select one of the listed product types in the sidebar. The listener program may detect that the selected product type is one corresponding to a portion of the document being edited by the specification program that is not currently displayed in the left section 62. As such, the listener program modifies or provides instructions to modify the display of the left section 62 (such as by scrolling, etc) to show the portion of the document to which the selected product type corresponds. Such modification of the display of the left section 62 may assist the user in understanding what portions of the edited document are potentially influenced by the information being researched.

Returning to FIG. 4 and the example of interaction between the left section 62 and the sidebar where one of the hyperlinks 70 has been selected in the left section 62 and the sidebar is updated accordingly, if, for example, the "Products" hyperlink 70 had been selected, the view of the sidebar might be similar to the depiction shown in FIG. 4. This view depicts various product types (e.g. Products 1-7) currently corresponding to the "Products" hyperlink 70 shown in the display area 68, along with an indication of the number of products in each product type. While FIG. 4 shows various product types (e.g. "Product 1," "Product 2," "Product 3," etc.), it should be understood that in this specific illustration, the product types may represent any of a variety of product information. For example, in at least some embodiments and cases, the product types displayed may correspond to individual products. In some embodiments and other cases, the product types displayed may not correspond to individual products, but may be types or classes of products, each having different individual products therein. In some embodiments and other cases, the product types displayed may be types or classes of products, each type or class being offered by a different manufacturer.

The information displayed may vary according to the needs of each individual situation and may also be varied according to which hyperlink 70 is selected. In other words, the system may determine that upon selection of a particular hyperlink 70 that it is preferable to show individual products, while upon selection of a different hyperlink 70 that it is preferable to show classes of products by type, while upon selection of a different hyperlink 70 that it is preferable to show classes of products by manufacturer. In some embodiments, the manner of showing information in the sidebar may default to any one of these or any other manner of organizing and displaying information. As such, the display of FIG. 4 and the particularly-discussed examples should not be considered limiting of the principles of the embodiments of the invention, but as examples intended to aid in understanding various embodiments.

The user might be able to select one or more of the items of information displayed in the sidebar to retrieve additional information, which can then be provided (e.g. displayed) to the user in any desirable fashion. For example, a portion of the display in the sidebar might be expanded to show the corresponding additional information. Alternatively, an additional window could be opened to display the corresponding additional information. As another alternative, a new tab could be opened within the current window, and the new tab might temporarily occupy the left section 60, thereby obscuring the normal view of the specification editor program. Of course, these specifically-mentioned examples are all intended to be illustrative of principles of embodiments of the invention, and are not intended to be restrictive of the manner of presenting additional information to the user.

Regardless of how the additional information is presented to the user, the presentation of the information greatly facilitates the user's finding of and researching information relevant to the specification creation. Because the information can be dynamically obtained from the database 50 at the time in which the user is interested in the information, the information presented to the user is timely, relevant, and up-to-date, and the user's research needs can be largely or entirely met in a few easy steps with minimal to no need for additional research. The information can then be incorporated into the specification in any of a variety of automated fashions, such as by automatic insertion upon user-initiated action or by drag-and-drop, designating certain portions of the located information for incorporation into the specification, or any other process (not shown with respect to FIG. 4). The entire specification can thus be researched and created simply by way of following a template specification, selecting the various hyperlinks 70 as the specification is being authored, and incorporating any desirable portion of the retrieved information supplied through the program.

As is shown in FIG. 4, the template specification includes various content sections and headings, and the hyperlinks 70 may be incorporated at any functional level within the specification content. The display provided in the sidebar (or elsewhere) may be varied according to the hyperlink 70 or other functional element selected, regardless of whether the hyperlink 70 or other functional element is selected from the specification editor program or from the sidebar. Before information is selected for incorporation into the template specification as part of the specification authoring process, the template specification may contain any one of a variety of different types of information corresponding to the information to be included according to the systems and methods discussed herein.

For example, in some circumstances, the template specification includes placeholder information that serves only to roughly indicate the scope of the information that will eventually be included in the specification once the corresponding information has been reviewed and selected for incorporation. In such circumstances, the placeholder information might not serve to be used in a finished construction specification. In other circumstances, the template specification includes template information drawn from the database 50, such as from an update retrieved at the time of authoring the specification. In such circumstances, the information may include a variety of different selections of the information drawn from the database 50. For example, the template specification might include all the relevant information from the database 50, such as all the products and/or manufacturers corresponding to a particular specification section. As another example, the template specification might only include a portion of the relevant information from the database 50 that has been found to be popularly incorporated among subscribers at the particular specification section. Alternatively, the template specification might only include a random selection of the relevant information from the database 50 corresponding to the particular specification section.

While the template specification may be updated to automatically include relevant information from the database 50 prior to customization by the user through finding and research of information by the methods discussed herein, it may be appreciated that given the size and scope of some specification documents, it may not be desirable to obtain an update for the entire specification (e.g. to avoid overloading existing network bandwidth). Instead, the template specification before customization might include information relevant to a previous point in time (e.g. a last time up-to-date information was obtained from the database 50). In such circumstances, the information initially displayed in the template specification may include all relevant information last obtained from the database 50, only a portion thereof found to be popular among subscribers, or only a random portion thereof.

Initially providing a template specification having information pre-entered therein may serve to inform the user as to the scope of what is commonly incorporated into the specification. As the user interacts with the program and the information accessed from the database 50 and incorporated into the specification using the computer program, the previously-present information can be replaced by the information selected for incorporation by the user. Thus, the information shown in the specification is essentially updated with the information selected by the user. Alternatively, the template specification may have little to no information present within certain sections of the template specification such that as the user interacts with the program and the information is accessed from the database 50 and incorporated into the specification using the computer program, the information is generated as content in the specification where little to no content was previously present.

In the screen shot shown in FIG. 4, the specification initially includes content represented by the list of products shown. The sidebar shown in FIG. 4 shows a listing of products arranged in groupings of product types, and this display of the sidebar might be shown, for example, upon selection of the "Products" hyperlink 70 from the specification. As discussed previously, selection of the "Products" hyperlink 70 causes up-to-date information to be retrieved from the database 50, in this case to be displayed for further interaction from within the sidebar. If the user selects one of the product type groups shown in the sidebar area in FIG. 4, the information displayed in the sidebar might change such that a new view is displayed such as that shown in FIG. 5.

Figure 5:
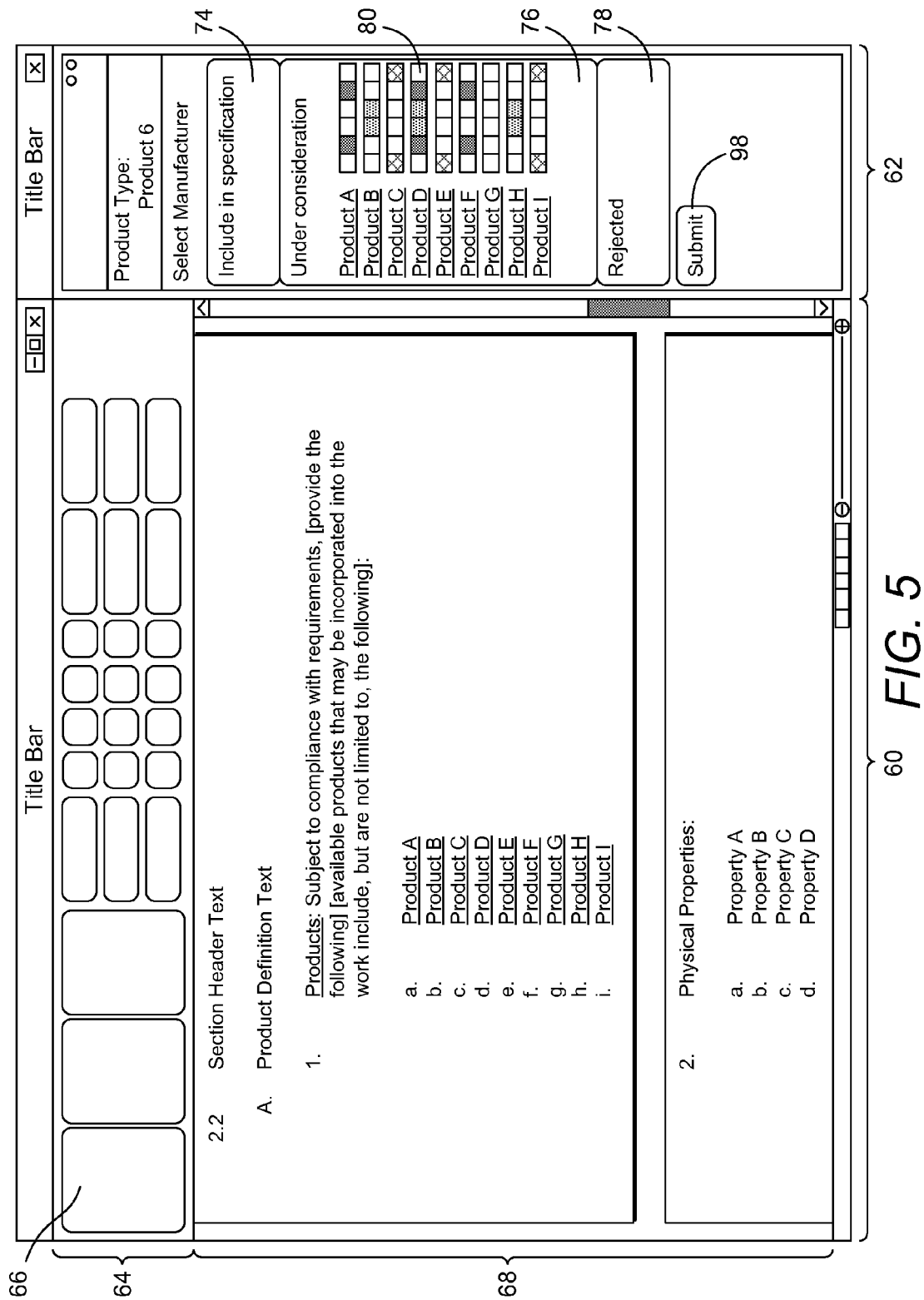

FIG. 5 shows an alternative display of information in the sidebar area, with specific products within a group of products being shown for the user to obtain information about the products. The list of products is provided in the display of FIG. 5 as being within one of several evaluation bins. The evaluation bins shown in FIG. 5 are representative of types of evaluation bins that may be used to sort information for inclusion in the specification. Thus, while certain specific evaluation bins are shown in FIG. 5, other sorting schemas and evaluation bins may be used that differ from the specific examples shown. The evaluation bins shown in FIG. 5 are an accepted bin 74, an under consideration bin 76, and a rejected bin 78. Each product listed in each bin may have additional information displayed with it, such as using one or more information icons 80 provided adjacent to or otherwise associated with the product.

In the example shown in FIG. 5, all the products are currently shown as being in the under consideration bin 76. In embodiments of the invention, any products that have not yet been evaluated for potential inclusion in the specification are initially provided in the under consideration bin 76. Thus, during the process of first drafting or creating the specification, all products associated with any hyperlinks 70 or other functional elements are provided in the under consideration bin 76. Similarly, during later revision of the specification, if a new product has become available (e.g. due to an update of information at the database 50), the new product is listed in the under consideration bin 76 along with any products that were not assigned to either of the accepted bin 74 or the rejected bin 78. If a product that has previously been assigned to one of the accepted bin 74 or the rejected bin 78 is later updated with different information such as differing properties or other characteristics, it may be returned to the under consideration bin 76 upon editing of the specification with the computer program, or some notice of the change may be provided to the user.

Regardless, products or other items of information contained in any of the under consideration bin 76, the accepted bin 74, or the rejected bin 78 can be selected for viewing of additional information related to the product. FIGS. 6-10 depict screen shots representative of how additional information may be displayed. It should be understood that if information relating to construction standards, manufacturers, or any other type of information is selected for viewing of additional information, similar processes and screen shots may be displayed but with the information displayed being customized as necessary for the type of additional information being displayed. Thus, the discussion with respect to FIGS. 6-10 is intended merely to illustrate principles of function applicable to certain embodiments of the invention.

Figure 6:
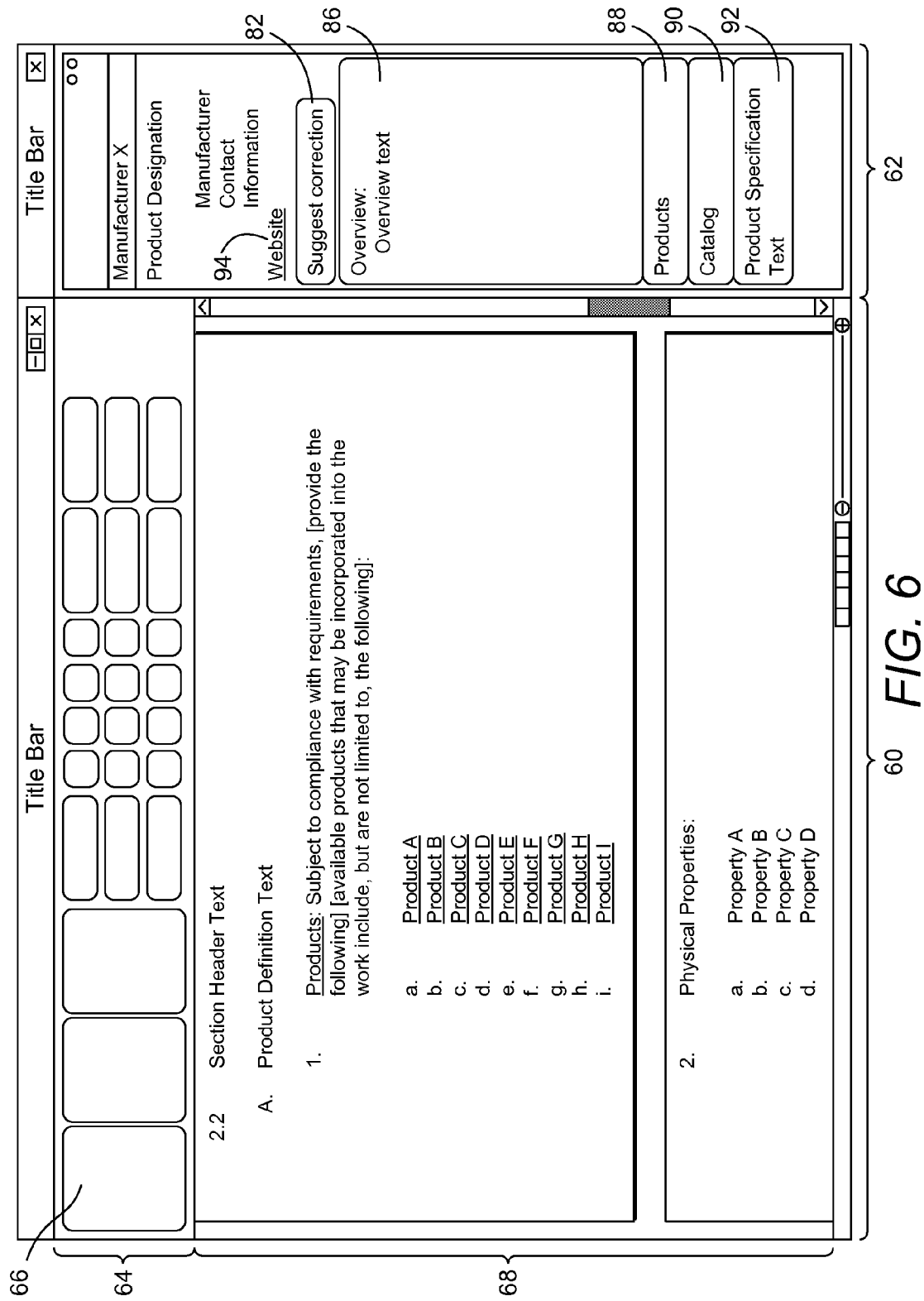

Selection of one of the listed products might display information about the product and/or information about a manufacturer of the product, including information about how the product can be obtained by the manufacturer. As discussed above, the information displayed can be provided directly by the manufacturer, or it may be provided by another entity. Regardless of how the information is initially provided, it can be displayed in one of several ways. In FIG. 6, manufacturer information is displayed in the sidebar. As seen in FIG. 6, near the top of the sidebar, the manufacturer is listed along with contact information about the manufacturer, which might include address and phone number information, as well as website, social media and networking information, or any other type of desirable information. Additionally, a suggest correction button 82 is optionally displayed.

The suggest correction button 82 provides a mechanism whereby the user of the computer program can assist in keeping the database 50 as up-to-date as possible. Thus, if the user is aware of information shown in the sidebar that is incorrect or out-of-date in any way, the user can select the suggest correction button 82 (wherever it is provided) to provide updated information to be considered for inclusion in the database. For example, if the user tries to contact the manufacturer using the listed contact information and discovers that the phone number is incorrect, the user could select the suggest correction button 82 and either provide the correct number or simply indicate that the provided number is incorrect. Similarly, correction may be requested for many types of data provided according to embodiments of the invention, and the suggest correction button 82 may be provided wherever it is advantageous to have user ability to improve the quality of the information in the database.

Figure 7:
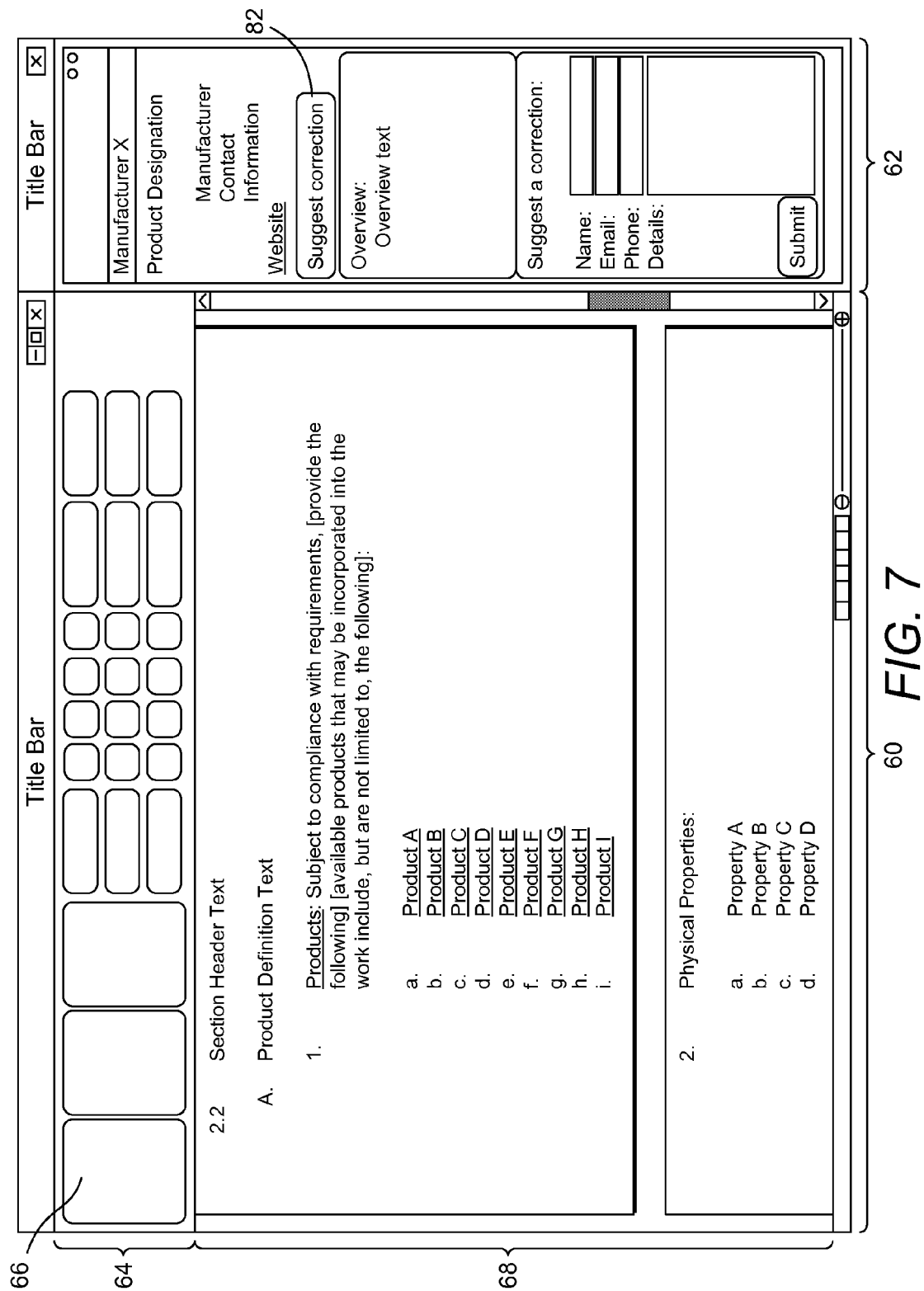

If the user selects the suggest correction button 82 shown in FIG. 6, the display of FIG. 6 might be changed to something similar to that shown in FIG. 7. In the view of FIG. 7, a suggested correction information entry box has been provided in the lower portion of the sidebar. Information relating to the suggested correction, as well as potentially contact information for the person suggesting the correction may be entered and submitted. Of course, the illustrated suggested correction information entry box is only an example of one way in which correction of information may be provided from the user, and any other mechanisms may similarly be used. Any suggested corrections may be reviewed by an administrator and adopted or incorporated where desirable to improve the functionality of embodiments of the invention and to ensure that the most up-to-date information is available.

Returning to FIG. 6, the sidebar also displays several representative subwindows displaying information relating to the manufacturer. The subwindows shown in FIG. 6 are only intended to be illustrative of manners of showing different types of information within a limited display area such as the sidebar. In FIG. 6, an overview subwindow 86, a products subwindow 88, a catalog subwindow 90 and a product specification text subwindow 92 are shown, with the overview subwindow 86 being expanded to display additional information related, in this instance, to an overview of the manufacturer. Selection of any of the subwindows may cause the selected subwindow to toggle between an expanded and a contracted view, whereupon additional information may be displayed accordingly. If necessary, a control such as a pagination controller or scroll bar may be optionally displayed when information to be displayed exceeds that which can be conveniently displayed at once within the area of the sidebar.

As the area of display within the sidebar is relatively small, the area of display of the left section 60 may be utilized from time to time to display additional information, thereby providing an additional mechanism for facilitating the user's finding and researching of information for inclusion in the specification. When the left section 60 is used to display additional information in this fashion, the normal view of the specification editor program may be temporarily obscured. Thus, for example, if the user selects a link 94 to the manufacturer's website from the display of FIG. 6, the display may be altered to that shown in FIG. 8, where the left section 60 now displays the manufacturer's website or an applicable portion thereof. Essentially, the left section 60 now acts as a web browser such that the user can continue finding and researching information about the manufacturer, products, cost information, etc. as needed for incorporation into the specification.

Any desirable functions of a web browser may be provided to the user to facilitate such finding and researching, including tabbed browsing, menu bars, address bars, etc. Additionally, the user may be able to toggle between the view of the web browser functions and the specification editor program to better understand how information may be applicable to the specification. Thus, embodiments of the invention permit switching between sources of information in various ways without requiring that the user be required to re-open certain viewers and re-navigate to the desired location.

Figure 8:
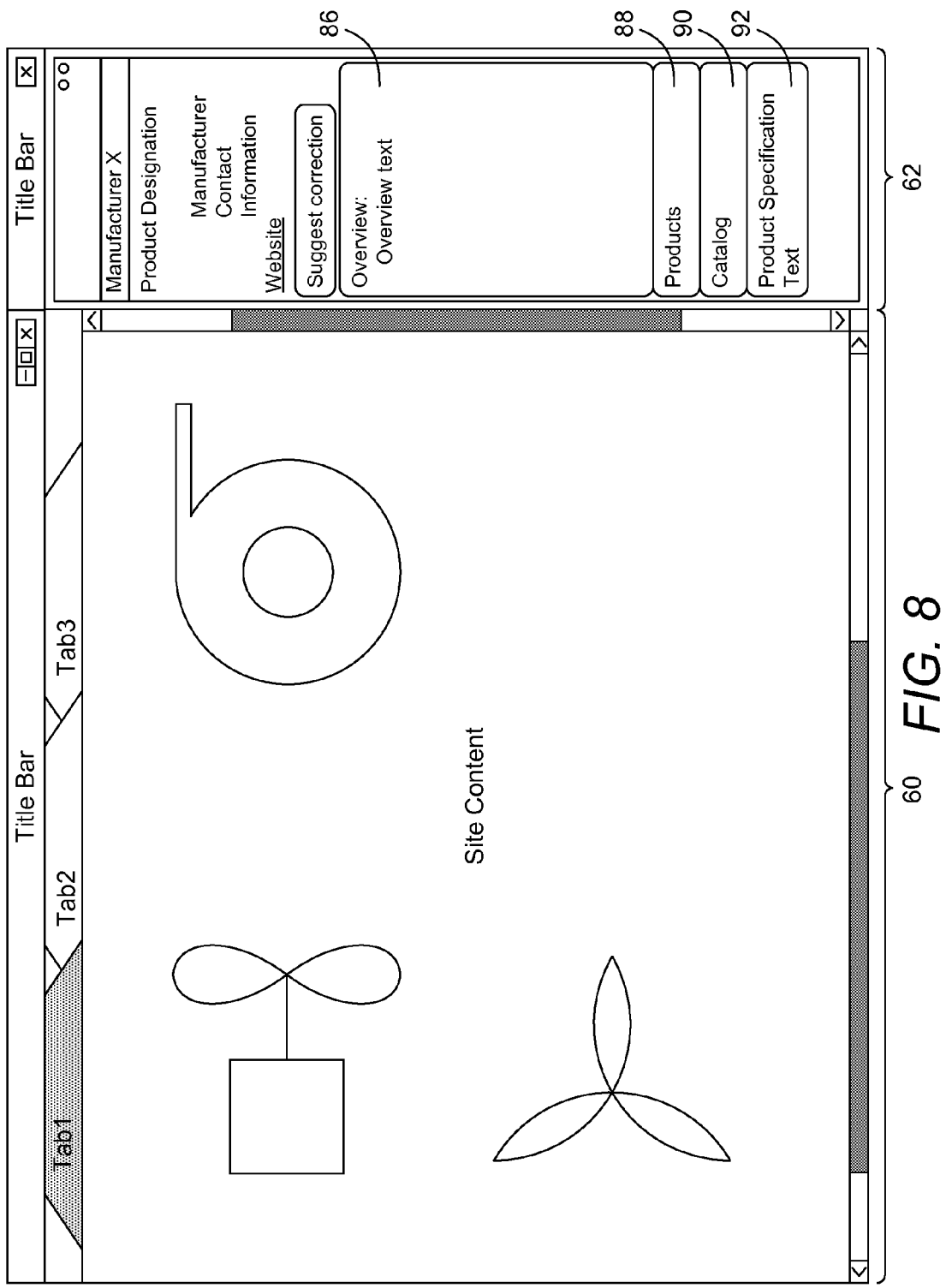
Figure 9:
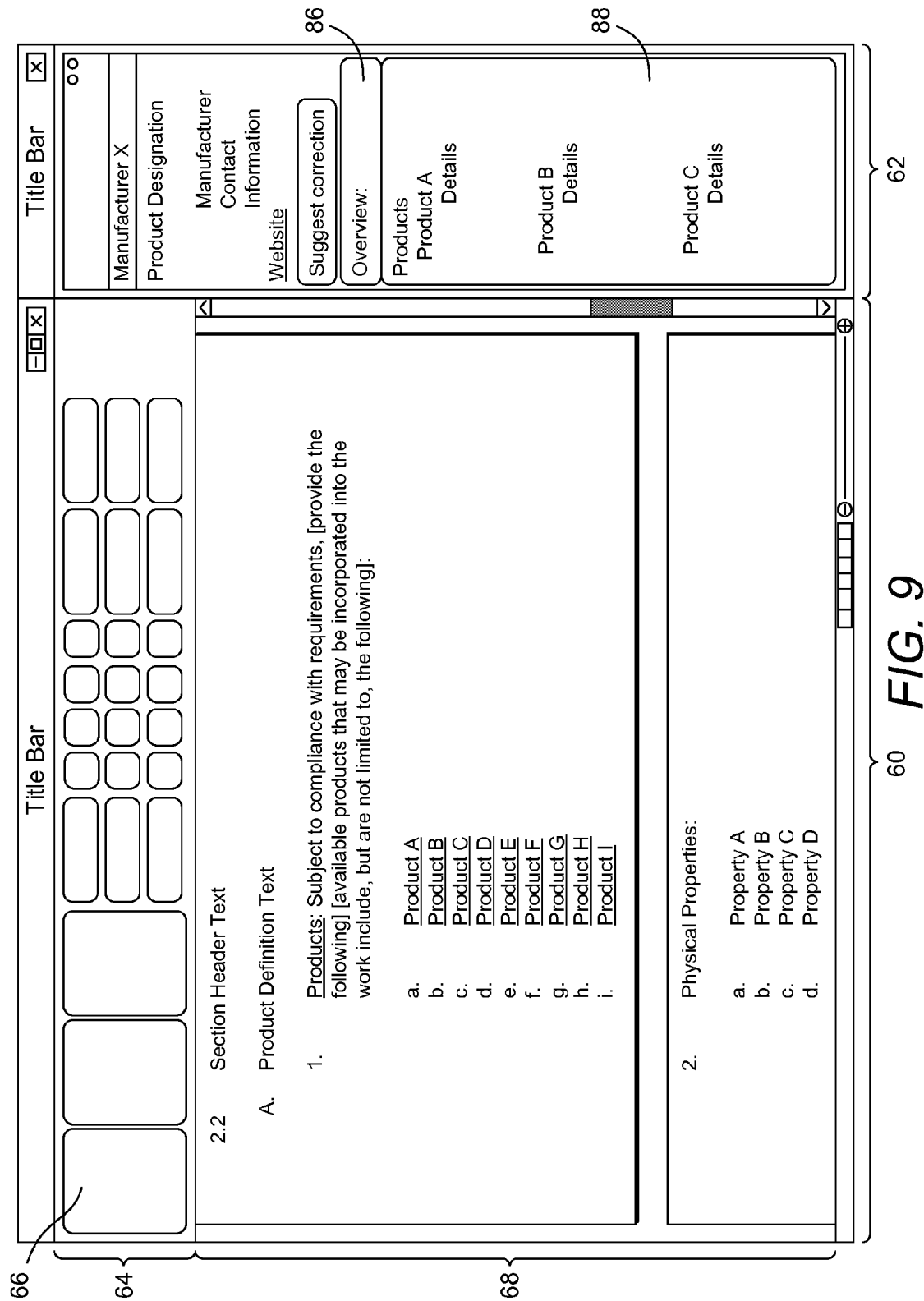
Figure 10:
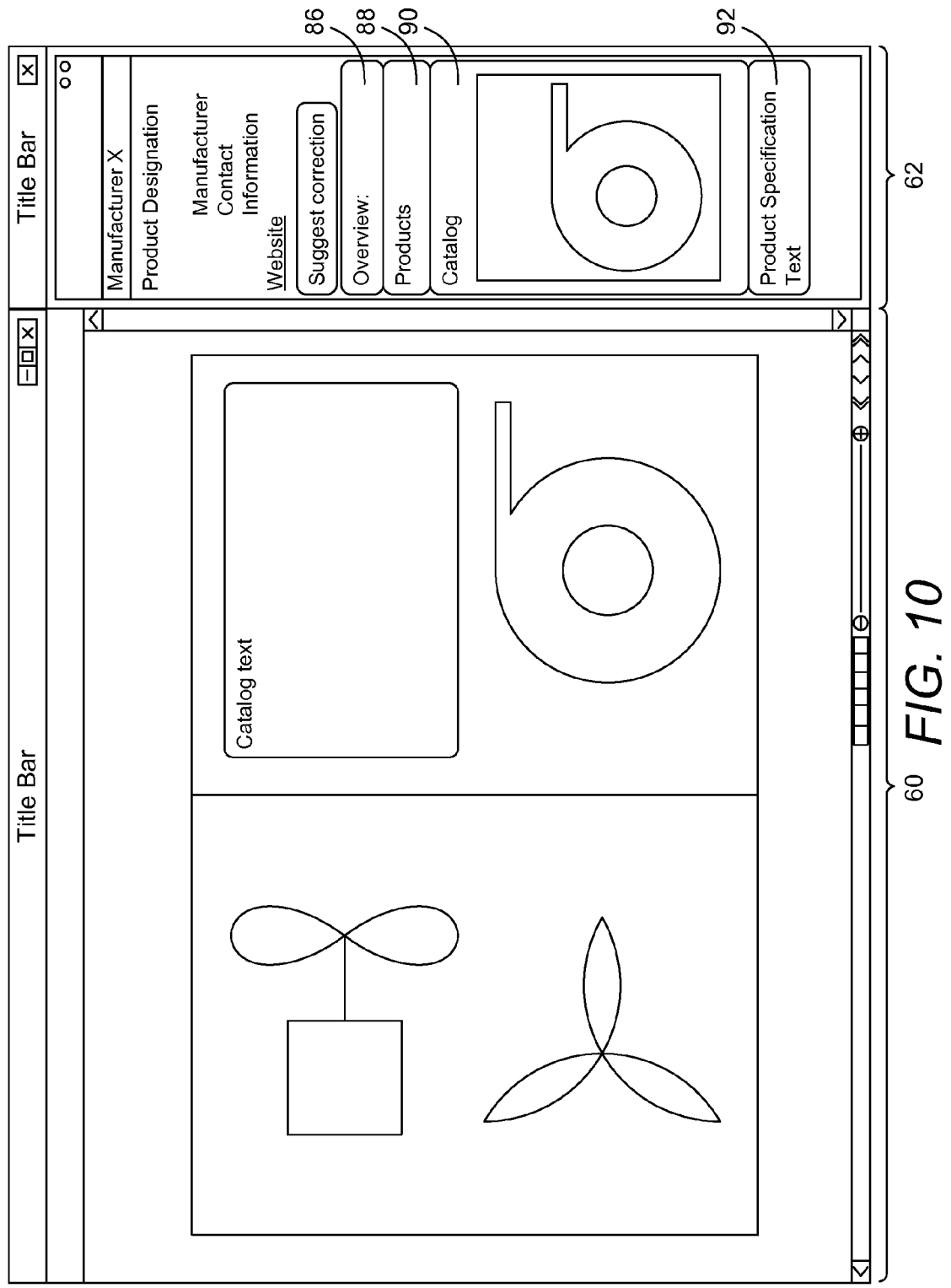
Figure 11:
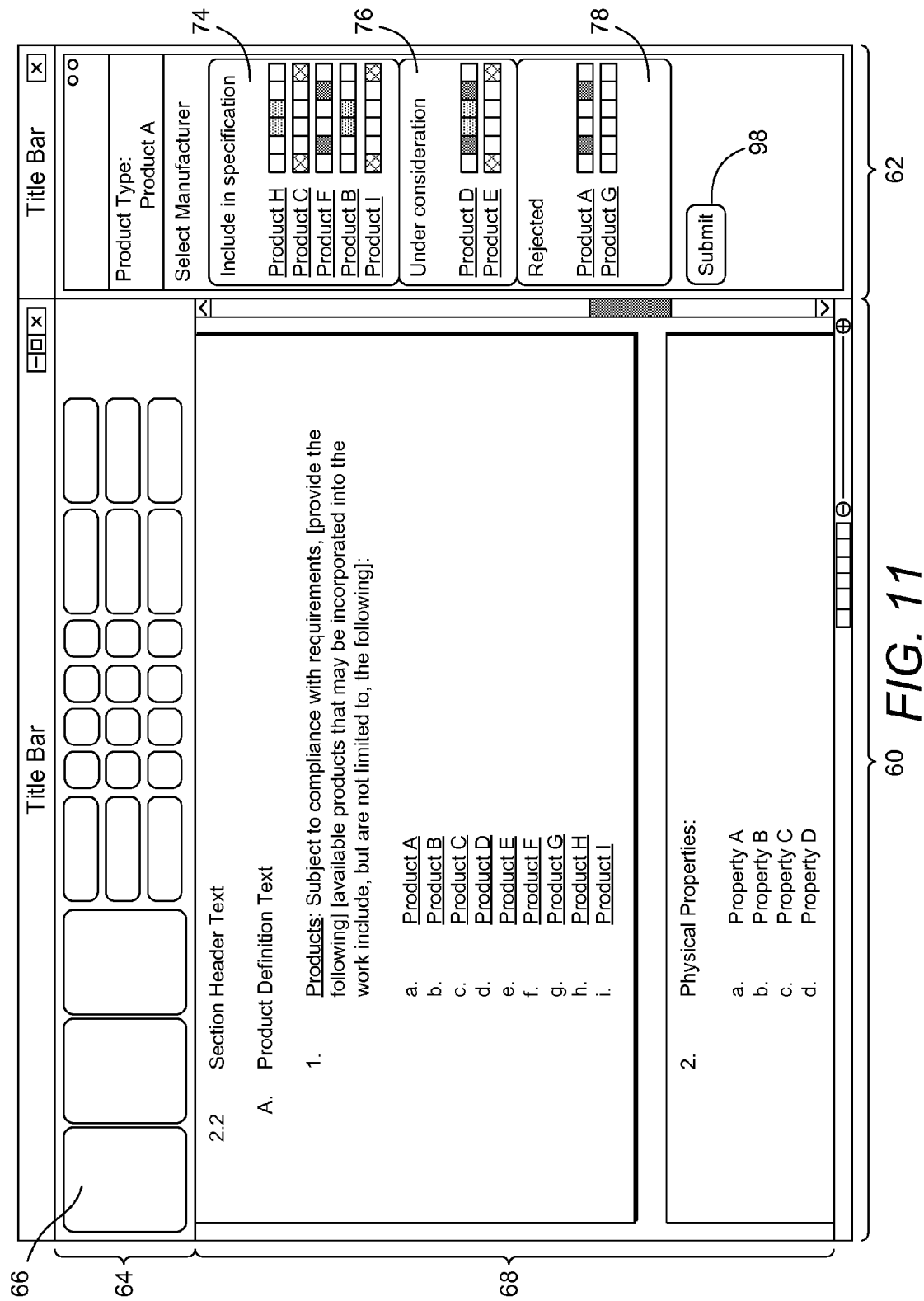

Thus, for example, the user might view the screen as displayed in FIG. 6, and could select the link 94 to view the manufacturer's website, whereupon the view of FIG. 8 could be shown, and the user could conduct some research as to certain products provided by a certain manufacturer. The user could toggle back to the view of the specification editor and could then select the products subwindow 88 and/or the overview subwindow 86 (depending on whether selection of a single subwindow automatically minimizes the other subwindows) to obtain a display similar to that shown in FIG. 9, and could then confirm information about products that could potentially be incorporated into the specification. If further information is desired, the user could select the catalog subwindow 88 and/or the products subwindow 86 to display a product catalog, and to potentially open the product catalog for viewing to obtain the display shown in FIG. 10.

In this display, a catalog viewer is used, again occupying the display area of the left section 60. The catalog viewer may be similar to or different from the web browser, and when the catalog viewer is displayed, the web browser may optionally remain open and directed to its previous location in the background in the event further information from the manufacturer website is desired. The catalog viewer may include controls for controlling the view of the catalog displayed in the catalog viewer, such as zoom, pagination, scroll bars, and other controls as are known in the art. In some instances, the information as displayed in a catalog differs in content or presentation from how it is presented on a website, and may therefore facilitate finding and researching information for potential inclusion in the specification for some users.

Expansion of the product specification text subwindow 92 may provide additional information to users that differs from the information provided through the other subwindows. Specifically, the product specification text subwindow 92 may allow the user to view the text that could potentially be included in the specification. In this way, the user is not only allowed to find and research information regarding products, standards, costs, sustainability, manufacturer, and any other type of information, but can also find and research specific specification text before it is included in the specification itself. The information that may be made available to the user in these various ways includes textual information, catalog information, photographic information, video information, or any other type of information that may be conveyed, for example, visually and/or audibly through a computer system.

As the user finds information and conducts research as discussed above, the user becomes aware of whether or not certain information should be included in the specification. Embodiments of the invention facilitate the automated inclusion of desired information in the specification, as well as replacement of portions of the template specification as appropriate to the selected construction product or material. Such replacement could include specific properties, values, units of measure, and test methods that describe the construction product or material. Thus, the user might return to the view of FIG. 5 and the displayed evaluation bins, and might determine that certain products should be included in the specification, certain products should not be included in the specification, and that further consideration might be necessary for certain products. The reasons for including, excluding, and further considering certain products can vary for any reasons, including for cost reasons, local availability reasons, local construction code reasons, climate reasons, aesthetic reasons, sustainability reasons, personal preference reasons, or any other applicable reasons either discovered through the information provided as discussed herein or otherwise known.

The program therefore receives indications as to whether the products shown in the sidebar of FIG. 5 are to be accepted for inclusion into the specification or are rejected and are not to be included in the specification. This indication may be received in any of a variety of ways, such as by the user dragging and dropping products between the various evaluation bins, e.g. from the under consideration bin 76 to the accepted bin 74, from the under consideration bin 76 to the rejected bin 78, from the accepted bin 74 to the rejected bin 78, or vice-versa, etc. Any selection may be reversible and may be changed at any point in time. Other fashions for indicating acceptance are also envisioned, such as selecting a box to indicate inclusion, right clicking on a product and selecting an option to include or exclude the product, etc., and the foregoing are merely examples of mechanisms for indicating whether or not to include products in the specification.

In addition to the large-scale sorting of products between the accepted bin 74, the under consideration bin 76, and the rejected bin 78, certain embodiments of the invention may also permit smaller-scale sorting or ordering of products within the various evaluation bins. For example, even though certain products may all be acceptable for inclusion in the specification, the user may wish to list the products in a particular order or ranking (e.g. most commonly used products first). Thus, the user may be able to change the order of products listed in the accepted bin 74, e.g. by drag-and-drop as discussed above.

In certain embodiments, as the user indicates which products are accepted and rejected for inclusion in the specification and potentially as the user sorts the products, the user's choices are tracked and stored (e.g. using metadata, cookies, or the like) and an opportunity may be provided to the user to indicate why certain choices were made. When the user provides an indication as to why any choices were made, the reasoning behind the user's choices may also be tracked and stored. In this way, the user's choices may be used for collaborative and other purposes, such as with a user's team (e.g. an office in which the user works), and generally with other users and manufacturers. For example, if the user is working in collaboration, the tracking of a user's choices and the reasons behind those choices may allow the user's supervisor to review the user's work. As another example, the tracking of the user's choices may reduce the amount of research needed for future projects. Additionally, the reasons behind changes can be evaluated and changes can be accepted or re-visited as necessary as a project progresses. At least some embodiments of the invention allow user choices to be shared in specific or in aggregate with other users to provide useful information for users to make decisions about manufacturers and products. The sharing can be user controlled, such as sharing specific selections and reasons with selected members of the user's project team, and automatically controlled, such as sharing aggregate selection data in a report available to all users.

On a larger scale, the choices of many individual users may be used to improve all users' experience with the specification editing and generation software. For example, choices that tend to be popular in a particular region, industry, etc. may be tracked and may be used in various ways. Popular choices may be used to pre-fill certain sections of a template specification or may be marked with a designator indicating they are popular choices. Manufacturers may be provided with feedback as to why certain products tend to be accepted or rejected for inclusion in specifications, allowing manufacturers to respond, such as by changing products, providing new products, providing additional information about existing products, etc. These are just examples of the ways in which users' choices can be used outside of the generation of the particular specification.

Figure 12:
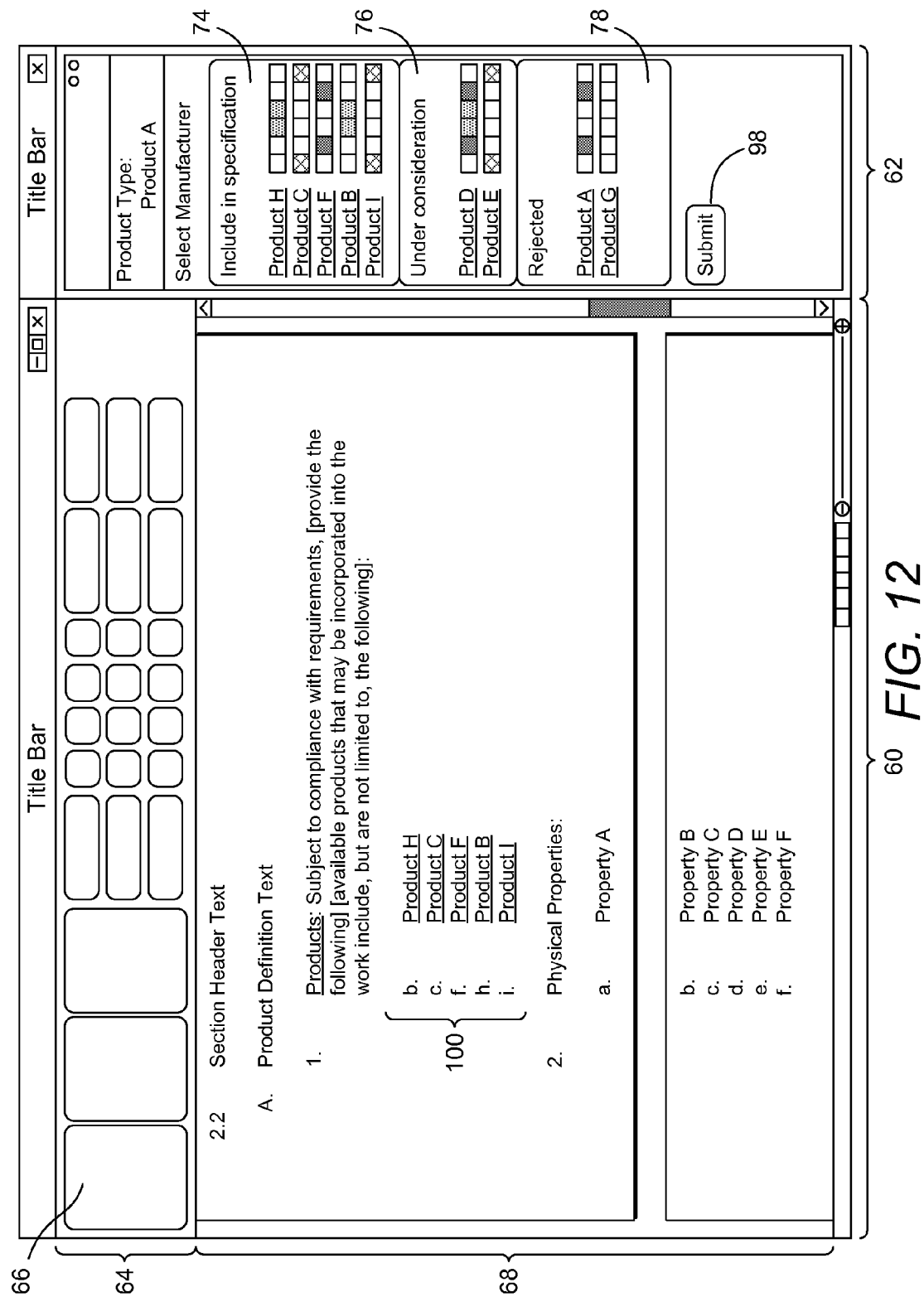

FIG. 12 shows a view that might be displayed after some initial selections had been made. In this case, Products B, C, F, H, and I have been moved to the accepted bin 74 while Products A and G have been moved to the rejected bin. Products D and E remain in the under consideration bin 76 for additional evaluation later. It may also be noted that the user has opted to list the products in the accepted bin 74 in the order of Product H, Product C, Product F, Product B, and then Product I. At this point, the user might decide that he or she is ready to have the specification updated, and indicates this to the program, such as by selecting an import button 98, whereupon the information is automatically updated in the specification, as illustrated in FIG. 12, which shows that a listing of included products 100 has been updated to match the products included in the accepted bin 74. Such listings include hyperlinks to the database in the same manner as the original hyperlink 70 to facilitate further research and updating.

The foregoing discussion illustrates only one way in which the sidebar may be used to facilitate research of information and automated incorporation of information into the specification. Many other potential manners of facilitating research of information and incorporation of information into the specification are envisioned and embraced by the various embodiments of the invention. As an illustrative example, interaction with the specification document (e.g. the hyperlinks 70 or other functional links) or with an element of the sidebar may activate other software, plugins, applications, and the like to interface with the information within the database 50, such that resulting information can be efficiently researched and incorporated into the specification. As one example, a paint selection wizard to assist a user in choosing an appropriate paint for a particular application could be activated, such as using one of the hyperlinks 70 or from a functional element within the sidebar or the left section 60.

The paint selection wizard could be provided by a paint manufacturer and could interface with the system, or the paint selection wizard could be provided as an integral part of the system. The paint selection wizard could operate in any appropriate fashion, including any fashion now known in the art or later invented. Upon activation of the paint selection wizard, the user interacts with the wizard, essentially conducting research into information relating to, for example, paints that could be incorporated into a project or projects represented by the specification. As the user interacts with the wizard, the user could take actions essentially selecting or choosing information about paints to be incorporated into the specification. As a result of the interaction with the wizard, the specification can be automatically changed to incorporate information corresponding to the user's interaction with the wizard, which may include manufacturer/product information, modified specification language, etc. Numerous other software and web applications could be similarly integrated into the system in some embodiments of the invention.

Once information has been automatically transferred to the specification, the information in the specification may be customized or edited manually as desired. Additionally, the information that has been included may be revisited at any time simply by selecting the appropriate hyperlink 70 as has been discussed previously. Once editing of a particular section has been completed, or at any other desired time, a different hyperlink 70 may be selected, which will result in the display of newly-desired information in the sidebar, effectively replacing the information that was previously displayed in the sidebar, although that information can typically be retrieved at any time simply by selecting the appropriate hyperlink 70 or other functional element and navigating to the desired information.

Figure 13:
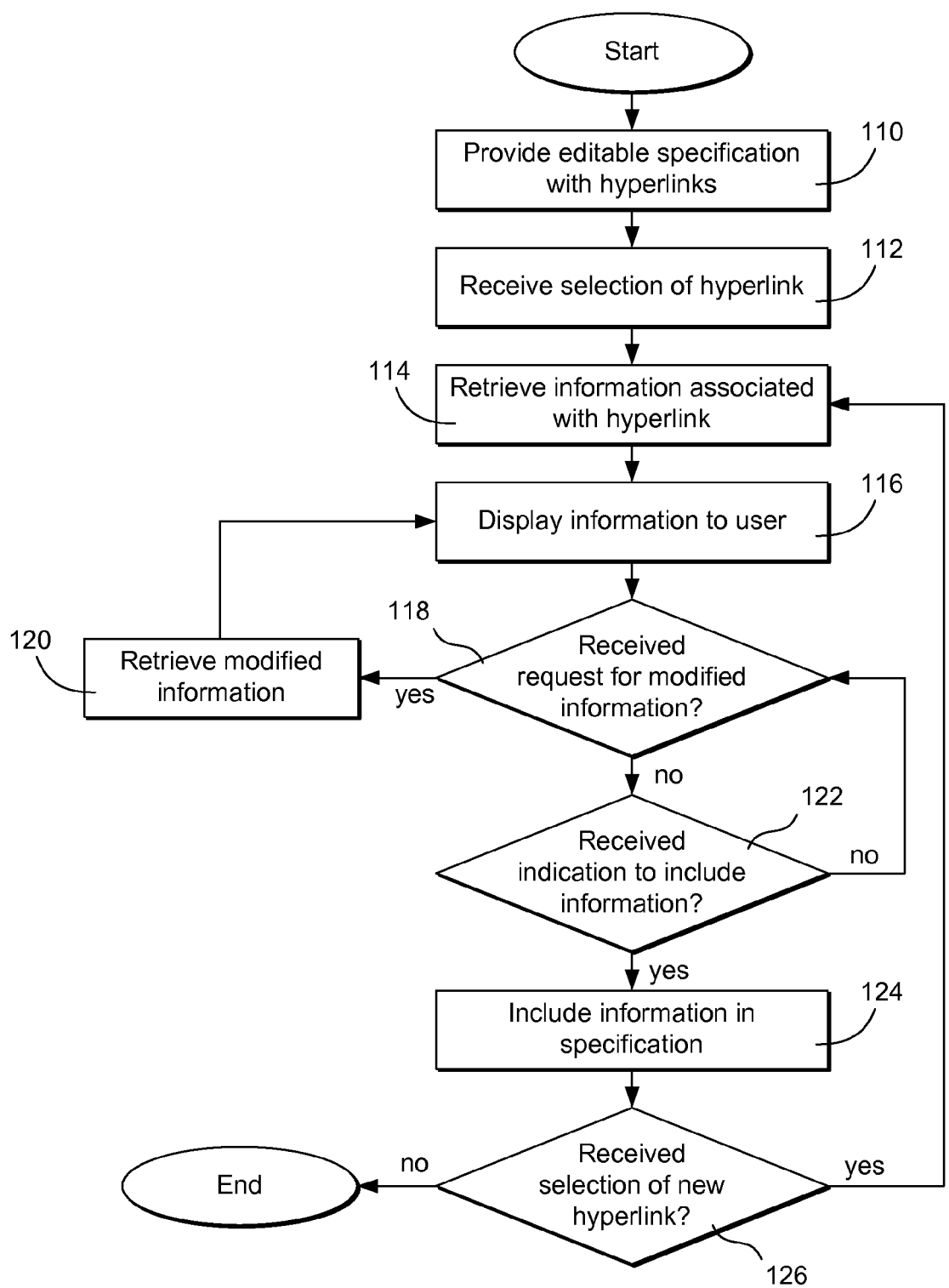
FIGS. 13-14 show flowcharts illustrating methods in accordance with embodiments of the invention.

To further illustrate functioning of embodiments of the invention, FIG. 13 shows a flowchart illustrating processes according to certain embodiments of the invention. Execution begins at step 110, where the specification is provided to the user. At step 112, selection of a hyperlink 70 or some other functional element indicating a desire for additional information is received. At step 114, information associated with the selected hyperlink 70 or other functional element is retrieved from the database 50 and is displayed to the user at step 116. In this way, the user is assisted in finding and researching information.

Execution then proceeds to decision block 118, were a determination is made as to whether a request has been received for modified information. Such a request may be made by interacting with the hyperlinks 70 in the specification (e.g. selecting a different hyperlink 70), or by interacting with elements in the sidebar to further investigate and research information previously displayed there. If such a request has been received, execution proceeds to step 120, where the modified information is retrieved, and then back to step 116 for display of the modified information to the user.

If no request for modified information has been received, execution proceeds to decision block 122, where a determination is made as to whether an indication has been received to include information in the specification. If no such indication has been received, execution loops back to decision block 118. If, however, an indication to include information in the specification has been received, information is included in the specification as directed at step 124. In this fashion, the automated inclusion of located and researched information in the specification is facilitated.

Execution then proceeds to decision block 126, where a determination is made as to whether a new hyperlink 70 or other functional element has been selected. If so, execution loops back to step 114 for retrieval and display of the information associated with the new hyperlink 70 or other functional element. If not, execution of the process ends, although the process can be restarted at any time from any location in the process that facilitates generation and/or editing of the specification.

While embodiments of the invention have been illustrated above with respect to a construction specification, embodiments of the invention may be used with any type of written document to which customized information is to be added, as well as with any other type of computer file or object, including construction computer-aided design (CAD) drawings, building information models (BIMs), and/or geographical information systems (GISs), in which information is to be reviewed, researched, customized, and/or incorporated. Thus, in another type of embodiment, the sidebar or its equivalent can be displayed adjacent to a CAD drawing, electronic BIM, and/or electronic GIS. The user clicks on a drawing item or model object, which includes metadata that the embodiment of the invention interprets and then displays the appropriate construction product and material research information. The user then proceeds to do the same type of research as previously described. Once a selection of construction products and materials is made, the embodiment of the invention imports the appropriate information into the CAD drawing, BIM, and/or GIS and associates them with the item or object, for example as metadata or properties.

Figure 14:
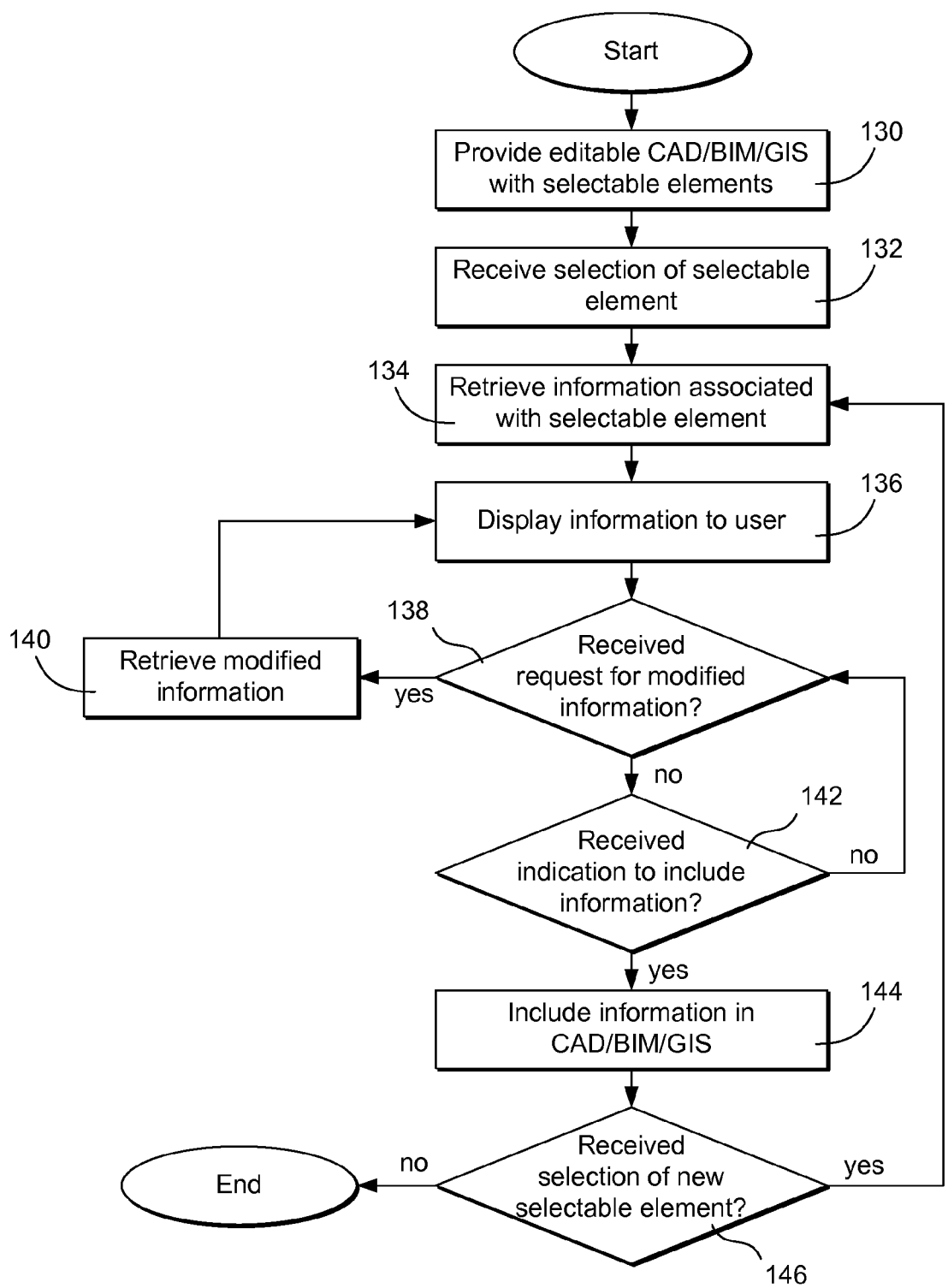

To further illustrate functioning of certain such embodiments of the invention, FIG. 14 shows a flowchart illustrating processes according to certain embodiments of the invention. Execution begins at step 130, where the CAD drawing, electronic BIM, and/or electronic GIS is provided to the user. At step 132, selection of a selectable element such as a drawing item or model object indicating a desire for additional information is received. At step 134, information associated with the selected selectable element is retrieved from the database 50 and is displayed to the user at step 136. In this way, the user is assisted in finding and researching information.

Execution then proceeds to decision block 138, were a determination is made as to whether a request has been received for modified information. Such a request may be made, for example, by interacting with the selectable elements in the CAD drawing, electronic BIM, and/or electronic GIS (e.g. selecting a different selectable element), or by interacting with elements in the sidebar to further investigate and research information previously displayed there. If such a request has been received, execution proceeds to step 140, where the modified information is retrieved, and then back to step 136 for display of the modified information to the user.

If no request for modified information has been received, execution proceeds to decision block 142, where a determination is made as to whether an indication has been received to include information in the CAD drawing, electronic BIM, and/or electronic GIS. If no such indication has been received, execution loops back to decision block 138. If, however, an indication to include information in the CAD drawing, electronic BIM, and/or electronic GIS has been received, appropriate information is included in the CAD drawing, electronic BIM, and/or electronic GIS as directed at step 144. In this fashion, the automated inclusion of located and researched information in the CAD drawing, electronic BIM, and/or electronic GIS is facilitated.

Execution then proceeds to decision block 146, where a determination is made as to whether a new selectable element has been selected. If so, execution loops back to step 134 for retrieval and display of the information associated with the new selectable element. If not, execution of the process ends, although the process can be restarted at any time from any location in the process that facilitates generation and/or editing of the CAD drawing, electronic and/or electronic GIS. The process of FIG. 14 thus serves to illustrate application of the concepts discussed herein to an embodiment other than generation of a specification and serves to illustrate how such concepts may be extended in many different fields of use other than those specifically illustrated herein.

Thus it may be seen that embodiments of the invention eliminate many of the problems with the current process of finding, researching, and integrating information into specifications (in the construction industry) and other documents (in any industry). Embodiments of the invention facilitate, for example, finding catalog information about construction products, finding sustainability information about construction products, finding construction standards applicable to construction products, and finding cost information about construction products. Embodiments of the invention further facilitate subsequently incorporating this information into the construction specifications.

As another example of a potential field of use, embodiments of the invention may be utilized to assemble an insurance policy from a database of insurance policy clauses (e.g. master text clauses). The assembly of the insurance policy may occur using a master checklist of coverages, exclusions, and endorsements selected by the user (e.g. an insurance professional). In such an embodiment, the master text clauses may include any possibly-applicable insurance policy clauses, and the like in industry-standard language, and the applicable research information could include information regarding governing laws and regulations that affect whether the clause is appropriate for the intended use. The foregoing is merely one example of an alternate field of use for embodiments of the invention. Embodiments of the invention may be utilized in any other desirable field of use.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for integrating research and incorporation of information into an information-rich construction specification document, the method comprising:
   providing by a computer device a template document having a plurality of updatable and modifiable data sections and one or more computer links for each of the sections corresponding to locations in a database of up-to-date potential customized template data;
   receiving by the computer device a selection of one of the computer links;
   retrieving by the computer device a plurality of up-to-date items of the customized template data from the database for possible inclusion in the template document as a customization thereof, the items corresponding to the selected computer link;
   determining by the computer device when one or more of the items that were previously accepted or previously rejected for inclusion in the template document during a prior edit of the template document have been updated in the database subsequent to the prior edit of the template document;
   providing by the computer device each of the items along with an associated indication of a user designation or a default designation of the items, wherein the default designation comprises an indication of the update for the one or more of the items, when the one or more of the items are determined to have been updated in the database subsequent to the prior edit; and
   automatically modifying by the computer device the template document to include or exclude customized template data based on the indication associated with each of the items comprising excluding the one or more of the items determined to have been updated in the database subsequent to the prior edit of the template document until the one or more of the items are designated as accepted for inclusion in the template document.

2. A method as recited in claim 1, wherein the items comprise one or more of: construction product and material data; sustainability data for construction products and materials; construction standards data; cost data for construction products and materials; or properties of construction products and materials.

3. A method as recited in claim 1, wherein the providing further comprises:
receiving, for any of the items, a designation as to whether the item is rejected or accepted;
storing the designation for each item as the designation is received until all desired designations are received;
receiving an instruction to update the template document; and
incorporating customized information for only those items that were designated as accepted into the template document.

4. A method as recited in claim 1, wherein the method further comprises:
receiving by the computer device a selection of a second of the computer links;
retrieving by the computer device a second plurality of up-to-date potential items of data for modification of the template document as a customization thereof corresponding to the second selected computer link from the database; and
providing by the computer device the second plurality of potential items for modification of the template document.

5. A method as recited in claim 1, wherein the method further comprises receiving and storing by the computer device reasons for inclusion or exclusion of any of the items.

6. A method as recited in claim 1, wherein the template document initially contains a section related to the selected computer link, and wherein the section related to the selected computer link is replaced with the included customized template data.

7. A non-transitory computer-readable medium storing program instructions for integrating research and incorporating information into an information-rich construction specification document comprising executable code which when executed by a processor, causes the processor to perform steps comprising:
providing a template document having a plurality of updatable and modifiable data sections and one or more computer links for each of the sections corresponding to location in a database of up-to-date potential customized template data;
receiving a selection of one of the computer links;
retrieving a plurality of up-to-date items of the customized template data from the database for possible inclusion in the template document as a customization thereof, the items corresponding to the selected computer link;
determining when one or more of the items that were previously accepted or previously rejected for inclusion in the template document during a prior edit of the template document have been updated in the database subsequent to the prior edit of the template document;
providing each of the items along with an associated indication of a user designation or a default designation of the items, wherein the default designation comprises an indication of the update for the one or more of the items, when the one or more of the items are determined to have been updated in the database subsequent to the prior edit; and
automatically modifying the template document to include or exclude customized template data based on the indication associated with each of the items comprising excluding the one or more of the items determined to have been updated in the database subsequent to the prior edit of the template document until the one or more of the items are designated as accepted for inclusion in the template document.

8. A non-transitory computer-readable medium as recited in claim 7, wherein the items of data comprise one or more of: construction product and material data; sustainability data for construction products and materials; construction standards data; cost data for construction products and materials; or properties of construction products and materials.

9. A non-transitory computer-readable medium as recited in claim 7, wherein the providing further comprises:
receiving, for any of the items, a designation as to whether the item rejected or accepted;
storing the designation for each item as the designation is received until all desired designations are received;
receiving an instruction to update the template document; and
incorporating customized information for only those items that were designated as accepted into the template document.

10. A non-transitory computer-readable medium as recited in claim 7, wherein the program instructions further comprise executable code which when executed by the processor, further causes the processor to perform additional steps comprising:
receiving a selection of a second of the computer links;
retrieving a second plurality of up-to-date potential items of data for modification of the template document as a customization thereof corresponding to the second selected computer link from the database of; and
providing the second plurality of potential items for modification of the template document.

11. A non-transitory computer-readable medium as recited in claim 7, wherein the program instructions further comprise executable code which when executed by the processor, further causes the processor to perform additional steps comprising receiving and storing reasons for inclusion or exclusion of any of the items.

12. A non-transitory computer-readable medium as recited in claim 7, wherein the template document initially contains a section related to the selected computer link, and wherein the section related to the selected computer link is replaced with the included customized template data.

13. A computing device, comprising a processor and a memory coupled to the processor which is configured to be capable of executing programmed instructions comprising and stored in the memory to:
provide a template document having a plurality of updatable and modifiable data sections and one or more computer links for each of the sections corresponding to locations in a database of up-to-date potential customized template data;
receive a selection of one of the computer links;
retrieve a plurality of up-to-date items of the customized template data from the database for possible inclusion in the template document as a customization thereof, the items corresponding to the selected computer link;
determine when one or more of the items that were previously accepted or previously rejected for inclusion in the template document during a prior edit of the template document have been updated in the database subsequent to the prior edit of the template document;

provide each of the items along with an associated indication of a user designation or a default designation of the items, wherein the default designation comprises an indication of the update for the one or more of the items, when the one or more of the items are determined to have been updated in the database subsequent to the prior edit; and automatically modify the template document to include or exclude customized template data based on the indication associated with each of the items comprising excluding the one or more of the items determined to have been updated in the database subsequent to the prior edit of the template document until the one or more of the items are designated as accepted for inclusion in the template document.

14. The computing apparatus as recited in claim 13, wherein the items of information comprise one or more of: construction product and material data; sustainability data for construction products and materials; construction standards data; cost data for construction products and materials; or properties of construction products and materials.

15. The computing device as recited in claim 13, wherein the processor coupled to the memory is further configured to be capable of executing additional programmed instructions comprising and stored in the memory to:

receive, for any of the items, a designation as to whether the item is rejected or accepted;

store the designation for each item as the designation is received until all desired designations are received;

receive an instruction to update the template document; and incorporate customized information for only those items that were designated as accepted into the template document.

16. The computing device as recited in claim 13, wherein the processor coupled to the memory is further configured to be capable of executing additional programmed instructions comprising and stored in the memory to:

receive a selection of a second of the computer links;

retrieve a second plurality of up-to-date potential items of data for modification of the template document as a customization thereof corresponding to the second selected computer link from the database; and provide the second plurality of potential items for modification of the template document.

17. The computing device as recited in claim 13, wherein the processor coupled to the memory is further configured to be capable of executing additional programmed instructions comprising and stored in the memory to receive and store reasons for inclusion or exclusion of any of the items.

18. The computing device as recited in claim 13, wherein the template document initially contains a section related to the selected computer link, and wherein the section related to the selected computer link is replaced with the included customized template data.

* * * * *